(12) United States Patent
Masuda et al.

(10) Patent No.: US 8,748,543 B2
(45) Date of Patent: Jun. 10, 2014

(54) POLYLACTIC ACID FILM

(75) Inventors: Shigeyoshi Masuda, Gifu (JP); Kohei Endo, Gifu (JP); Kinji Hasegawa, Gifu (JP)

(73) Assignee: Teijin Limited, Osaka (JP)

(*) Notice: Subject to any disclaimer, the term of this patent is extended or adjusted under 35 U.S.C. 154(b) by 167 days.

(21) Appl. No.: 13/119,671

(22) PCT Filed: Sep. 29, 2009

(86) PCT No.: PCT/JP2009/067315
§ 371 (c)(1),
(2), (4) Date: May 13, 2011

(87) PCT Pub. No.: WO2010/035911
PCT Pub. Date: Apr. 1, 2010

(65) Prior Publication Data
US 2011/0224342 A1    Sep. 15, 2011

(30) Foreign Application Priority Data

| Sep. 29, 2008 | (JP) | 2008-250945 |
| Feb. 4, 2009 | (JP) | 2009-023913 |
| Feb. 4, 2009 | (JP) | 2009-023914 |
| Feb. 4, 2009 | (JP) | 2009-023915 |

(51) Int. Cl.
*C08G 63/91* (2006.01)

(52) U.S. Cl.
USPC ............ 525/410; 525/415; 525/450

(58) Field of Classification Search
USPC ................ 525/410, 411, 415, 450
See application file for complete search history.

(56) References Cited

U.S. PATENT DOCUMENTS

| 4,719,246 A | 1/1988 | Murdoch et al. | |
| 2009/0251643 A1 | 10/2009 | Yamada et al. | |
| 2009/0318631 A1* | 12/2009 | Narita et al. | 525/450 |
| 2010/0182694 A1* | 7/2010 | Endo | 359/500 |

FOREIGN PATENT DOCUMENTS

| JP | 63-241024 A | 10/1988 | |
| JP | 2003-326594 A | 11/2003 | |
| JP | 2005-292229 A | 10/2005 | |
| JP | 2006-301047 A | 11/2006 | |
| JP | 2007-119553 A | 5/2007 | |
| JP | 2007-191630 A | 8/2007 | |
| JP | 2008-15408 A | 1/2008 | |
| JP | 2008-88402 A | 4/2008 | |
| JP | 2008-120893 * | 5/2008 | ............. C08L 67/04 |
| JP | 2008-120893 A | 5/2008 | |
| JP | 2008-163111 A | 7/2008 | |
| JP | 2008-233655 A | 10/2008 | |
| JP | 2008-242172 A | 10/2008 | |
| JP | 2008-248162 A | 10/2008 | |
| WO | 2007/066470 A1 | 6/2007 | |
| WO | WO 2008013295 A1 * | 1/2008 | ................ C08J 5/18 |
| WO | 2009/035127 A1 | 3/2009 | |

OTHER PUBLICATIONS

Hideto Tsuji, et al., "Stereocomplex Formation between Enantimomeric Poly(lactic acid)s. 3. Calorimetric Studies on Blend Films Cast from Dilute Solution," Macromolecules, 1991, pp. 5561-5656, vol. 24, No. 21.

Japanese Office Action for Application No. 2009-023914 dispatched Nov. 27, 2012.

Japanese Office Action for Application No. 2009-023915 dispatched Nov. 27, 2012.

International Preliminary Report on Patentability issued on May 19, 2011 for counterpart application PCT/JP2009/067315.

* cited by examiner

*Primary Examiner* — Robert Jones, Jr.
(74) *Attorney, Agent, or Firm* — Sughrue Mion, PLLC

(57) ABSTRACT

The polylactic acid film is obtained by melt extruding polylactic acid (A) prepared by melt kneading together polylactic acid (B) which comprises an L-lactic acid unit as the main ingredient and polylactic acid (C) which comprises a D-lactic acid unit as the main ingredient in a specific weight ratio, wherein the polylactic acid film has:

(a) a stereocomplex crystal rate (S) defined by the following equation (i) of 90% or more:

$$S = \{(\Delta Hmsc/(\Delta Hmsc + \Delta Hmh)\} \times 100 \qquad (i)$$

(in the above equation, $\Delta Hmh$ is the melting enthalpy of a low-melting point crystal melting peak at a temperature lower than 190° C. obtained by differential scanning calorimeter (DSC) measurement and $\Delta Hmsc$ is the melting enthalpy of a high-melting point crystal melting peak at a temperature of 190° C. or higher obtained by DSC measurement), (b) a haze of 10% or less, and (c) a haze change of 5% or less after it is heated at 140° C. for 10 minutes.

10 Claims, No Drawings

POLYLACTIC ACID FILM

TECHNICAL FIELD

The present invention relates to a polylactic acid film having excellent transparency and dimensional stability and a production process therefor.

BACKGROUND ART

The price of oil is zooming up due to environmental problems such as global warming, the apprehension of the exhaustion of oil and the supply situations of oil countries, and the development of non-petroleum resins is needed. Especially polylactic acid has the potential for substituting petroleum resins and is characterized by optical properties such as transparency and a low refractive index, and the development of its applications making use of these characteristic properties is expected.

However, polylactic acid generally has a low melting point of about 160° C. and involves a problem with heat resistance such as melting or deformation. Since polylactic acid also has a problem with the stability of physical properties that its biodegradation and deterioration in a wet heat environment proceed at a relatively high speed, its application is limited.

Meanwhile, it is known that stereocomplex polylactic acid is formed by mixing together poly (L-lactic acid) and poly (D-lactic acid) in a solution or molten state (Patent Document 1 and Non-patent Document 1). An interesting phenomenon that this stereocomplex polylactic acid has a melting point of 200 to 230° C. which is much higher than those of poly (L-lactic acid) and poly (D-lactic acid) and shows high crystallinity is found.

There are proposed industrial, agricultural and packaging films which can be used for high-temperature processing and heat-resistance applications and have improved biodegradability and deterioration in a wet heat environment by using this stereocomplex polylactic acid (Patent Document 2).

However, it is difficult to produce a transparent film from the stereocomplex polylactic acid for the following reasons.
(1) The stereocomplex polylactic acid is a composite composition having a poly(L-lactic acid) phase and a poly (D-lactic acid) phase (may be referred to as "homo-phase" hereinafter) and a stereocomplex polylactic acid phase (may be referred to as "complex-phase" hereinafter). In DSC measurement, generally, two peaks which are the melting peak of a crystal having a low melting point of 190° C. or lower corresponding to the melting peak of a homo-phase crystal and the melting peak of a crystal having a high melting point of 190° C. or higher corresponding to the melting peak of a complex-phase crystal are observed. It is not easy to produce a transparent film due to the existence of crystals having different melting points.
(2) The stereocomplex polylactic acid is a crystalline polymer and its crystals are easily oriented. That is, to form the stereocomplex polylactic acid into a film, it must be dried in advance to prevent its hydrolysis. When it is dried by heating in a hot air oven, the stereocomplex polylactic acid readily crystallizes. Also, when the stereocomplex polylactic acid is let pass through the melt preheating zone of an extruder to be melt extruded, the stereocomplex polylactic acid crystallizes and a homo-phase crystal and a complex-phase crystal are grown.

When both the homo-phase crystal having a low melting point and the complex-phase crystal having a high melting point are existent, this mixture is existent in two states which differ in rheological characteristics even when special attention is paid to melting and kneading. Thereby, a sea-island structure or a layer structure of a high-melting point portion and a low-melting point portion due to flow alignment is formed, and flow nonuniformity occurs due to the separation of the two phases, causing optical scattering and making it difficult to obtain a uniform film having a high transmittance.

Like the stretched film described in Patent Document 2, when the draw ratio is high, transparency degrades due to crystalline orientation. A film having a low oriented crystal rate like an unstretched film is readily whitened by heating and has a problem that it is wholly or partially whitened by molding including heating though it is transparent at room temperature. An optical film which is obtained from the stereocomplex polylactic acid, has such high transparency that it can be used for optical purposes and can retain transparency even when it is exposed to a high temperature at the time of processing is desired.
(Patent Document 1) JP-A 63-241024
(Patent Document 2) JP-A 2007-119553
(Non-patent Document 1) Macromolecules, 24, 5651 (1991)
(Non-patent Document 2) Introduction to Chemistry, No. 39, 1998 (published by the Academic Society Publishing Center)

DISCLOSURE OF THE INVENTION

It is therefore an object of the present invention to provide a polylactic acid film which has excellent transparency and can retain high transparency even when it is exposed to a high temperature. It is another object of the present invention to provide a polylactic acid film which has a specific phase difference (Re) in the plane direction and a phase difference (Rth) in the thickness direction, is excellent in dimensional stability at the time of heating and is useful for optical purposes.

The inventors of the present invention have conducted studies on melt extrusion, stretching and heat treatment conditions when stereocomplex polylactic acid is to be formed into a film and have found that the whitening of even an unstretched film or a film which has been stretched at a low draw ratio in a high-temperature environment is suppressed, thereby making it possible to obtain a polylactic acid film having high transparency. The present invention has been accomplished based on this finding.

That is, the present invention includes the following inventions.
1. A polylactic acid film obtained by melt extruding polylactic acid (A) prepared by melt kneading together polylactic acid (B) which comprises an L-lactic acid unit as the main ingredient and 0 to 10 mol % of a component excluding the L-lactic acid unit and polylactic acid (C) which comprises a D-lactic acid unit as the main ingredient and 0 to 10 mol % of a component excluding the D-lactic acid unit in a (B/C) weight ratio of 10/90 to 90/10, wherein
(a) the polylactic acid film has a stereocomplex crystal rate (S) defined by the following equation (i) of 90% or more:

$$S=\{(\Delta Hmsc/(\Delta Hmsc+\Delta Hmh)\}\times 100 \quad (i)$$

(in the above equation, $\Delta Hmh$ is the melting enthalpy of a low-melting point crystal melting peak at a temperature lower than 190° C. obtained by differential scanning calorimeter (DSC) measurement and $\Delta Hmsc$ is the melting enthalpy of a high-melting point crystal melting peak at a temperature of 190° C. or higher obtained by DSC measurement),
(b) a haze of 10% or less, and
(c) a haze change of 5% or less after it is heated at 140° C. for 10 minutes.

2. The polylactic acid film of the above paragraph 1 which is substantially unstretched, monoaxially stretched to less than 2 times or biaxially stretched at an area draw ratio of less than 4 times.
3. The polylactic acid film of the above paragraph 1 or 2 which is heated at 90 to 210° C.
4. The polylactic acid film (1) of any one of the above paragraphs 1 to 3 which has (d–1) a phase difference (Re) in the plane direction defined by the following equation (ii) of 20 nm or less and a phase difference (Rth) in the thickness direction defined by the following equation (iii) of less than 25 nm:

$$Re=(nx-ny)\times d \qquad \text{(ii)}$$

$$Rth=((nx+ny)/2-nz)\times d \qquad \text{(iii)}$$

(nx is a refractive index in the longitudinal direction of the film. ny is a refractive index in the transverse direction of the film. nz is a refractive index in the thickness direction of the film. d is the thickness (nm) of the film.),
and (e) a heat shrinkage factor in longitudinal and transverse directions of 4% or less when it is heated at 90° C. for 5 hours.
5. The polylactic acid film (2) of any one of the above paragraphs 1 to 3 which has (d–2) a phase difference (Re) in the plane direction defined by the following equation (ii) of 20 nm or less and a phase difference (Rth) in the thickness direction defined by the following equation (iii) of 25 to 90 nm:

$$Re=(nx-ny)\times d \qquad \text{(ii)}$$

$$Rth=((nx+ny)/2-nz)\times d \qquad \text{(iii)}$$

(nx is a refractive index in the longitudinal direction of the film. ny is a refractive index in the transverse direction of the film. nz is a refractive index in the thickness direction of the film. d is the thickness (nm) of the film.),
and (e) a heat shrinkage factor in longitudinal and transverse directions of 4% or less when it is heated at 90° C. for 5 hours.
6. The polylactic acid film (3) of any one of the above paragraphs 1 to 3 which has (d–3) a phase difference (Re) in the plane direction defined by the following equation (ii) of more than 20 nm and 130 nm or less and a phase difference (Rth) in the thickness direction defined by the following equation (iii) of 90 to 350 nm:

$$Re=(nx-ny)\times d \qquad \text{(ii)}$$

$$Rth=((nx+ny)/2-nz)\times d \qquad \text{(iii)}$$

(nx is a refractive index in the longitudinal direction of the film. ny is a refractive index in the transverse direction of the film. nz is a refractive index in the thickness direction of the film. d is the thickness (nm) of the film.),
and (e) a heat shrinkage factor in longitudinal and transverse directions of 4% or less when it is heated at 90° C. for 5 hours.
7. The polylactic acid film of any one of the above paragraphs 1 to 6 which contains triclinic inorganic particles (D) and/or a phosphoric acid ester metal salt (E).
8. The polylactic acid film of any one of the above paragraphs 1 to 7 which is an optical film.
9. The polylactic acid film of the above paragraph 4 which is an optical correction film for IPS-mode liquid crystal displays.
10. The polylactic acid film of the above paragraph 5 which is a protective film for polarizing plates.
11. The polylactic acid film of the above paragraph 6 which is an optical correction film for VA-mode liquid crystal displays.
12. A process for producing a polylactic acid film, comprising (1) the step of melt extruding polylactic acid (A) at a temperature from (Tmsc+5) to (Tmsc+50)° C. and a draft ratio of 2 to 80 (the polylactic acid (A) is prepared by melt kneading together polylactic acid (B) which comprises an L-lactic acid unit as the main ingredient and 0 to 10 mol % of a component excluding the L-lactic acid unit and polylactic acid (C) which comprises a D-lactic acid unit as the main ingredient and 0 to 10 mol % of a component excluding the D-lactic acid unit in a (B/C) weight ratio of 10/90 to 90/10; and Tmsc is the peak temperature of a high-melting point crystal melting peak at a temperature of 190° C. or higher obtained by DSC measurement).
13. The production process of the above paragraph 12, further comprising the step of substantially not stretching the film, monoaxially stretching it to less than 2 times or biaxially stretching it at an area draw ratio of less than 4 times after melt extrusion.
14. The production process of the above paragraph 12 or 13, further comprising the step of heating the film at 90 to 210° C. after melt extrusion.

BEST MODE FOR CARRYING OUT THE INVENTION

<Polylactic Acid Film>

The present invention will be described in detail hereinunder.

The polylactic acid film of the present invention is a film obtained by melt extruding polylactic acid (A) which is prepared by melt kneading together polylactic acid (B) comprising an L-lactic acid unit as the main ingredient and 0 to 10 mol % of a component excluding the L-lactic acid unit and polylactic acid (C) comprising a D-lactic acid unit as the main ingredient and 0 to 10 mol % of a component excluding the D-lactic acid unit.

(Polylactic Acid (B))

Although polylactic acid substantially consisting of an L-lactic acid unit and a copolymer of an L-lactic acid unit and another monomer such as D-lactic acid are enumerated as the polylactic acid (B), the polylactic acid (B) is particularly preferably poly (L-lactic acid) substantially consisting of an L-lactic acid unit.

The content of the L-lactic acid unit of the polylactic acid (B) is 90 to 100 mol %, preferably 95 to 100 mol %, more preferably 98 to 100 mol % from the viewpoints of physical properties such as crystallinity and the heat resistance of the film. That is, the content of a comonomer unit excluding the L-lactic acid unit is 0 to 10 mol %, preferably 0 to 5 mol %, more preferably 0 to 2 mol %.

The polylactic acid (B) has crystallinity and a melting point of preferably 150 to 190° C., more preferably 160 to 190° C. When the polylactic acid (B) has a melting point within this range and stereocomplex polylactic acid is formed from the polylactic acid (B), a stereocomplex crystal having a higher melting point can be formed and crystallinity can be raised.

The weight average molecular weight of the polylactic acid (B) is preferably 80,000 to 250,000, more preferably 100,000 to 250,000, much more preferably 120,000 to 200,000. By using the polylactic acid (B) having this weight average molecular weight, stereocomplex polylactic acid can be produced industrially efficiently, and the transparency range of the polylactic acid film of the present invention can be achieved while the flow nonuniformity of the polylactic acid (A) is suppressed.

The polylactic acid (B) may optionally contain a comonomer component excluding L-lactic acid as long as its crystallinity is not impaired.
(Polylactic Acid (C))

Although polylactic acid substantially consisting of a D-lactic acid unit, and a copolymer of a D-lactic acid unit and another monomer such as L-lactic acid are enumerated as the polylactic acid (C), the polylactic acid (C) is particularly preferably poly (D-lactic acid) substantially consisting of a D-lactic acid unit.

The content of the D-lactic acid unit of the polylactic acid (C) is 90 to 100 mol %, preferably 95 to 100 mol %, more preferably 98 to 100 mol % from the viewpoints of physical properties such as crystallinity and the heat resistance of the film. That is, the content of a comonomer unit excluding the D-lactic acid unit is 0 to 10 mol %, preferably 0 to 5 mol %, more preferably 0 to 2 mol %.

The polylactic acid (C) has crystallinity and a melting point of preferably 150 to 190° C., more preferably 160 to 190° C. When the polylactic acid (C) has a melting point within this range and stereocomplex polylactic acid is formed from the polylactic acid (C), a stereocomplex crystal having a higher melting point can be formed and crystallinity can be raised.

The weight average molecular weight of the polylactic acid (C) is preferably 80,000 to 250,000, more preferably 100,000 to 250,000, much more preferably 120,000 to 200,000. By using the polylactic acid (C) having this weight average molecular weight, stereocomplex polylactic acid can be produced industrially efficiently, and the transparency range of the polylactic acid film of the present invention can be achieved while the flow nonuniformity of the polylactic acid (A) is suppressed.

The polylactic acid (B) and the polylactic acid (C) may optionally contain a comonomer component excluding L-lactic acid and D-lactic acid as long as their crystallinities are not impaired. The comonomer component is not particularly limited. The comonomer component is at least one monomer selected from hydroxycarboxylic acids such as glycolic acid, caprolactone, butyrolactone and propiolactone, aliphatic diols having 2 to 30 carbon atoms such as ethylene glycol, 1,3-propanediol, 1,2-propanediol, 1,4-propanediol, 1,5-propanediol, hexanediol, octanediol, decanediol and dodecanediol, aliphatic dicarboxylic acids having 2 to 30 carbon atoms such as succinic acid, maleic acid and adipic acid, aromatic diols or aromatic dicarboxylic acids such as terephthalic acid, isophthalic acid, hydroxybenzoic acid and hydroquinone.
(Production of Polylactic Acid (B) and Polylactic Acid (C))

The processes for producing the polylactic acid (B) and the polylactic acid (C) are not particularly limited, and conventionally known processes can be advantageously used.

For example, they can be produced by directly dehydrating and condensing L- or D-lactic acid, solid-phase polymerizing an L- or D-lactic acid oligomer, or cyclodehydrating L- or D-lactic acid to obtain a lactide and then melt ring-opening polymerizing the lactide. Out of these, polylactic acid obtained by direct dehydration and condensation or the melt ring-opening polymerization of a lactide is preferred from the viewpoints of quality and production efficiency, and the melt ring-opening polymerization of the lactide is most preferably selected.

Any catalyst may be used in these production processes if the polylactic acid (B) and the polylactic acid (C) can be polymerized to have the above predetermined characteristic properties. That is, well-known examples of the catalyst for the melt ring-opening polymerization of the lactide include fatty acid salts, carbonates, sulfates, phosphates, oxides, hydroxides, halides and alcoholates of an alkali metal, alkali earth metal, rare earth, transition metal, aluminum, germanium, tin or antimony.

Out of these, a catalyst containing at least one selected from tin, aluminum, zinc, calcium, titanium, germanium, manganese, magnesium and rare earth elements is preferred. The catalyst may be referred to as "specific metal-containing catalyst" hereinafter.

The following compounds are enumerated as examples of the specific metal-containing catalyst. That is, they are stannous chloride, stannous bromide, stannous iodide, stannous sulfate, stannic oxide, tin myristate, tin octylate, tin stearate, tetraphenyltin, tin methoxide, tin ethoxide, tin butoxide, aluminum oxide, aluminum acetylacetonato, aluminum isopropoxide, aluminum-imine complex titanium tetrachloride, ethyl titanate, butyl titanate, glycol titanate, titanium tetrabutoxide, zinc chloride, zinc oxide, diethylzinc, antimony trioxide, antimony tribromide, antimony acetate, calcium oxide, germanium oxide, manganese oxide, manganese carbonate, manganese acetate, magnesium oxide and yttrium alkoxide.

Tin-containing compounds such as stannous chloride, stannous bromide, stannous iodide, stannous sulfate, stannic oxide, tin myristate, tin octylate, tin stearate and tetraphenyltin and aluminum-containing compounds such as aluminum acetylacetonato, aluminum butoxide and aluminum-imine complex are preferred in consideration of less catalystic activity and less by sub-reaction. The following compounds are more preferred.

That is, they are diethoxytin, dinonyloxytin, tin myristate, tin octylate, tin stearate, tin chloride, aluminum acetylacetonato and aluminum isopropoxide.

The amount of the catalyst is $0.42 \times 10^{-4}$ to $100 \times 10^{-4}$ (mol) based on 1 kg of the lactide. When the color and stability of the obtained polylactide are taken into consideration, the catalyst is used in an amount of preferably $1.68 \times 10^{-4}$ to $42.1 \times 10^{-4}$ (mol), particularly preferably $2.53 \times 10^{-4}$ to $16.8 \times 10^{-4}$ (mol).

It is preferred that the polymerization catalyst for the polylactic acid (B) and the polylactic acid (C) should be removed by a conventionally known method, for example, washing with a solvent, or that its catalytic activity should be deactivated or inactivated from the viewpoints of the melt stability and wet heat stability of the polylactic acid (A) and the polylactic acid film.

The following compound is given as a deactivator used to deactivate the catalyst for polylactic acid which is polymerized in the presence of the specific metal-containing catalyst.

That is, it is a resin which contains at least one selected from the group consisting of organic ligands consisting of chelate ligands which have an imino group and can coordinate to the specific metal-containing polymerization catalyst, oxophosphoric acid, oxophosphoric acid esters and organic oxophosphoric acid compounds represented by the following formula, in an amount of 0.3 to 20 equivalents based on 1 equivalent of the metal element of the specific metal-containing catalyst.

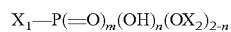

(in the above formula, m is 0 or 1, n is 1 or 2, and $X_1$ and $X_2$ are each independently a hydrocarbon group which may have a substituent with 1 to 20 carbon atoms.)

The amount of the deactivator is preferably 0.4 to 15 equivalents, particularly preferably 0.5 to 10 equivalents based on the above standard.

The imine-based compound is a phenol four-sited chelate ligand which has imono groups in the structure and can coordinate to the metal-based polymerization catalyst. Since the imine-based compound of the present invention is not Brφnsted acid or base unlike a conventional catalyst deactivator, it can improve the heat stability of polylactic acid without deteriorating its hydrolysis resistance. Examples of the imine-based compound include N,N'-bis(salicylidene)ethylenediamine and N,N'-bis(salicylidene)propanediamine.

Examples of the oxophosphoric acid include low oxidation number phosphoric acids having an acid number of or less, such as dihydride oxophosphoric acid (I), dihydride tetraoxodiphosphoric acid (II,II), hydride trioxophosphoric acid (III), dihydride pentaoxodiphosphoric acid (III), hydride pentaoxodiphosphoric acid (II, IV), dodecaoxohexaphosphoric acid (III), hydride octaoxotriphosphoric acid (III, IV, IV), octaoxotriphosphoric acid (IV, III, IV), hydride hexaoxodiphosphoric acid (III, V), hexaoxodiphosphoric acid (IV), decaoxotetraphosphoric acid (IV), hendecaoxotetraphosphoric acid (IV) and enneaoxotriphosphoric acid (V, IV, IV).

Orthotriphosphoric acids represented by the formula $(xH_2O.yP_2O_5)$ and satisfying $x/y=3$; polyphosphoric acids called "diphosphoric acid, triphosphoric acid, tetraphosphoric acid and pentaphosphoric acid" according to the degree of condensation all of which satisfy $2>x/y>1$ and mixtures thereof; metaphosphoric acids which satisfy $x/y=1$, particularly trimetaphosphoric acid and tetrametaphosphoric acid; ultraphosphoric acids having a net structure containing part of a phosphorus pentaoxide structure and satisfying $1>x/y>0$; and partial esters and whole esters of monohydric or polyhydric alcohols of these acids or polyalkylene glycols are further included. An acid or acid ester is advantageously used from the viewpoint of catalyst deactivation capability.

The alcohol forming the ester of oxophosphoric acid is not particularly limited but the monohydric alcohol is preferably an alcohol which may have a substituent with 1 to 22 carbon atoms and is represented by the following formula.

In the above formula, Y is a hydrocarbon group which may have a substituent with 1 to 22 carbon atoms.

Specific examples of the monohydric alcohol include methyl alcohol, ethyl alcohol, propyl alcohol, butyl alcohol, 2-ethyhexyl alcohol, decanol, dodecanol, benzyl alcohol, cyclohexyl alcohol, hexyl alcohol, phenol and hexadecyl alcohol.

The polyhydric alcohol is selected from a polyhydric alcohol and a sugar alcohol which may have a substituent with 2 to 22 carbon atoms and are represented by the following formula.

In the above formula, X is a hydrocarbon group which may have a substituent with 2 to 22 carbon atoms, and a is an integer of 2 to 6.

Specific examples of the polyhydric alcohol include ethylene glycol, 1,3-propanediol, 1,4-butanediol, 1,6-hexanediol, glycerin, pentaerythritol, trimethylolpropane, polyethylene glycol, polypropylene glycol, inositols such as myo-inositol, D- and L-inositol and scyllo-inositol, and cyclitol.

Particularly preferred examples of the deactivator include phosphoric acid, phosphorous acid, hypophosphoric acid, pyrophosphoric acid, trimetaphosphoric acid, tetrametaphosphoric acid, phenylphosphonic acid, benzylphosphinic acid, dibutyl phosphate, dinonyl phosphate, N,N'-bis(salicylidene) ethylenediamine and N,N'-bis(salicylidene)propanediamine. Out of these, phosphoric acid, phosphorous acid and pyrophosphoric acid are most preferred.

A phosphono fatty acid ester may also be used as the deactivator.

The phosphono fatty acid ester used in the present invention is a compound in which a diester phosphonate moiety and a carboxylic ester moiety are bonded together by an aliphatic hydrocarbon group. Since this phosphono fatty acid ester is colorless and transparent and has excellent heat resistance, the obtained composition has a good color. The phosphono fatty acid ester having a chemical structure represented by the following formula (3) particularly gives excellent results to the purpose of the present invention.

In the above formula, $R_1$ to $R_3$ are each independently an alkyl group having 1 to 20 carbon atoms or aryl group having 6 to 12 carbon atoms. Examples of the alkyl group include ethyl group, propyl group, butyl group, pentyl group and hexyl group. Examples of the aryl group include phenyl group and naphthalene-yl group. $R_1$ to $R_3$ may be the same or different. n is an integer of 1 to 3.

Examples of the compound represented by the formula (3) include ethyl diethyl phosphonoacetate, ethyl di-n-propyl phosphonoacetate, ethyl di-n-butyl phosphonoacetate, ethyl di-n-hexyl phosphonoacetate, ethyl di-n-octyl phosphonoacetate, ethyl di-n-decyl phosphonoacetate, ethyl di-n-dodecyl phosphonoacetate, ethyl di-n-octadecyl phosphonoacetate, ethyl diphenyl phosphonoacetate, decyl diethyl phosphonoacetate, dodecyl diethyl phosphonoacetate, octadecyl diethyl phosphonoacetate, ethyl diethyl phosphonopropionate, ethyl di-n-propyl phosphonopropionate, ethyl di-n-butyl phosphonopropionate, ethyl di-n-hexyl phosphonopropionate, ethyl di-n-octyl phosphonopropionate, ethyl di-n-decyl phosphonopropionate, ethyl di-n-dodecyl phosphonopropionate, ethyl di-n-octadecyl phosphonopropionate, ethyl diphenyl phosphonopropionate, decyl diethyl phosphonopropionate, dodecyl diethyl phosphonopropionate, octadecyl diethyl phosphonopropionate, ethyl diethyl phosphonobutyrate, ethyl di-n-propyl phosphonobutyrate, ethyl di-n-butyl phosphonobutyrate, ethyl di-n-hexyl phosphonobutyrate, ethyl di-n-octyl phosphonobutyrate, ethyl di-n-decyl phosphonobutyrate, ethyl di-n-dodecyl phosphonobutyrate, ethyl di-n-octadecyl phosphonobutyrate, ethyl diphenyl phosphonobutyrate, decyl diethyl phosphonobutyrate, dodecyl diethyl phosphonobutyrate and octadecyl diethyl phosphonobutyrate. When efficacy and handling ease are taken into consideration, ethyl diethyl phosphonoacetate, ethyl di-n-propyl phosphonoacetate, ethyl di-n-butyl phosphonoacetate, ethyl di-n-hexyl phosphonoacetate, decyl diethyl phosphonoacetate and octadecyl diethyl phosphonoacetate are preferred.

When the number of carbon atoms of $R_1$ to $R_3$ in the formula (3) is 20 or less, the melting point of the phosphono fatty acid ester becomes lower than the production temperature of polylactic acid or a composition, thereby making it possible to melt and mix the phosphono fatty acid ester fully and to capture the metal polymerization catalyst efficiently. The phosphono fatty acid ester has an aliphatic hydrocarbon group between the diester phosphonate moiety and the carboxylic ester moiety. To capture the metal polymerization catalyst contained in the polylactic acid efficiently, n is preferably an integer of 1 to 3 in the formula (3).

The content of the phosphono fatty acid ester is 0.001 to 0.5 part by weight, preferably 0.02 to 0.2 part by weight based on 100 parts by weight of the polylactic acid. When the content of the phosphono fatty acid ester is too low, the deactivation efficiency of the residual metal polymerization catalyst becomes extremely low, and a satisfactory effect is not obtained. When the content is too high, the contamination of a metal mold and a spinneret used at the time of molding and spinning becomes marked.

These deactivators may be used alone or in combination. The deactivator is used in an amount of preferably 0.3 to 20 equivalents, more preferably 0.5 to 15 equivalents, much more preferably 0.5 to 10 equivalents, particularly preferably 0.6 to 7 equivalents based on 1 equivalent of the metal element of the specific metal-containing catalyst.

When the amount of the deactivator is too small, the activity of the catalytic metal cannot be reduced fully and when the amount of the deactivator is too large, the deactivator may cause the decomposition of the resin disadvantageously.

(Polylactic Acid (A))

The polylactic acid (A) is obtained by melt kneading together the polylactic acid (B) and the polylactic acid (C) in a weight ratio of 10/90 to 90/10 at 220 to 300° C.

The weight ratio of the polylactic acid (B) to the polylactic acid (C) is preferably 30/70 to 70/30, more preferably 40/60 to 60/40 to enhance the stereocomplex crystal rate (S) of the polylactic acid (A). It is particularly preferably as close to 50/50 as possible.

The melt kneading temperature is preferably 230 to 300° C., more preferably 240 to 280° C., much more preferably 245 to 275° C. from the viewpoint of improving stability at the time of melting polylactic acid and stereocomplex crystal rate (S).

The stereocomplex crystal rate (S) of the polylactic acid (A) can be increased to 80% or more by melt kneading them together in the above mixing ratio at the above kneading temperature. The stereocomplex crystal rate (S) of the polylactic acid film is preferably 90 to 100%, more preferably 95 to 100%, particularly preferably 100%.

Although the melt kneading method is not particularly limited, a batch or continuous type melt mixer is preferably used. For example, a melt stirring tank, a single-screw or double-screw extruder, a kneader, an anaxial basket-type stirring tank, the Vibolac of Sumitomo Heavy Industries, Inc., the N—SCR reactor of Mitsubishi Heavy Industries, Ltd., the spectacle-shaped blades polymerizer, lattice blade (type polymerizer) or Kenix type static Mixer of Hitachi, Ltd. or a tubular polymerizer comprised of Sulzer type SMLX static mixer may be used. Out of these, an anaxial basket type stirring tank which is a self-cleaning type polymerizer, N-SCR and a double-screw extruder are preferred from the viewpoints of productivity and the quality, especially, color of the polylactic acid.

It is preferred that the polylactic acid (B) and the polylactic acid (C) should be melt kneaded together in the above mixing ratio and the polylactic acid (A) having the above stereocomplex crystal rate range should be melt extruded and formed into a film because flow nonuniformity caused by the separation of the above two phases can be suppressed and a polylactic acid film having high transparency and excellent heat resistance can be produced.

The weight average molecular weight of the polylactic acid (A) is preferably 80,000 to 250,000, more preferably 100,000 to 250,000, much more preferably 120,000 to 200,000. This weight average molecular weight range is preferred from the viewpoints of suppressing flow nonuniformity, improving transparency and enhancing the mechanical properties and durability of the film.

(Crystallization Nucleating Agent (Steric Accelerator))

The polylactic acid (A) preferably contains at least one selected from triclinic inorganic particles (D) and a phosphoric acid ester metal salt (E) as a crystallization nucleating agent (also called "steric accelerator").

The stereocomplex crystal rate (S) of the polylactic acid film can be increased to 90% or more, preferably 95% or more, more preferably 97% or more by mixing this agent.

The crystallization nucleating agent is effective in making a melting peak derived from stereocomplex polylactic acid obtained by DSC measurement a single peak, that is, setting the stereocomplex crystal rate (S) to 100%. The polylactic acid (A) having a high stereocomplex crystal rate (S) is preferred for the production of a transparent heat-resistant film.

Various agents are known as nucleating agents for improving the crystallinity of polylactic acid. In the present invention, the triclinic inorganic particles (D) and the phosphoric acid ester metal salt (E) which are suitable for improving the stereocomplex crystal rate (S) or the transparency of the polylactic acid film are preferably used though their distinct functions and mechanisms are unknown in the present invention.

Examples of the triclinic inorganic particles (D) include wollastonite, xonotollite, boric acid stone, calcium metasilicate ($\alpha$), calcium metasilicate ($\beta$), manganese metasilicate, calcium sulfate, cerium sulfate (III), zinc phosphate, zinc dihydrogen phosphate, calcium dihydrogen phosphate, aluminum aluminosilicate and potassium aluminosilicate.

Out of these, wollastonite, calcium sulfate and calcium metasilicate are preferred, and wollastonite and calcium metasilicate ($\alpha$) are particularly preferred from the viewpoints of improving the stereocomplex crystal rate (S) and the transparency of the film.

The phosphoric acid ester metal salt (E) used in the present invention is preferably an aromatic organic phosphoric acid ester metal salt represented by the formula (1) or (2).

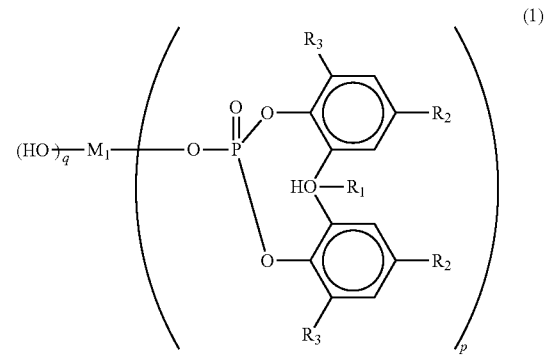

(1)

In the above formula, $R_1$ is a hydrogen atom or alkyl group having 1 to 4 carbon atoms, $R_2$ and $R_3$ are each independently a hydrogen atom or alkyl group having 1 to 12 carbon atoms, $M_1$ is an alkali metal atom, alkali earth metal atom, zinc atom or aluminum atom, p is 1 or 2, and q is 0 when $M_1$ is an alkali metal atom, alkali earth metal atom or zinc atom and 1 or 2 when $M_1$ is an aluminum atom.

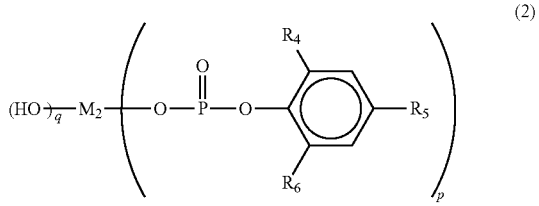

In the above formula, $R_4$, $R_5$ and $R_6$ are each independently a hydrogen atom or alkyl group having 1 to 12 carbon atoms, $M_2$ is an alkali metal atom, alkali earth metal atom, zinc atom or aluminum atom, p is 1 or 2, and q is 0 when $M_2$ is an alkali metal atom, alkali earth metal atom or zinc atom and 1 or 2 when $M_2$ is an aluminum atom.

These aromatic organic phosphoric acid ester metal salts may be used alone or in combination.

$R_1$ in the formula (1) is a hydrogen atom or alkyl group having 1 to 4 carbon atoms. Examples of the alkyl group having 1 to 4 carbon atoms represented by $R_1$ include methyl group, ethyl group, n-propyl group, iso-propyl group, n-butyl group, sec-butyl group and iso-butyl group.

$R_2$ and $R_3$ are each independently a hydrogen atom or alkyl group having 1 to 12 carbon atoms. Examples of the alkyl group having 1 to 12 carbon atoms include methyl group, ethyl group, n-propyl group, iso-propyl group, n-butyl group, sec-butyl group, iso-butyl group, tert-butyl group, amyl group, tert-amyl group, hexyl group, heptyl group, octyl group, iso-octyl group, tert-octyl group, 2-ethylhexyl group, nonyl group, iso-nonyl group, decyl group, iso-decyl group, tert-decyl group, undecyl group, dodecyl group and tert-dodecyl group.

$M_1$ is an alkali metal atom such as Na, K or Li, alkali earth metal atom such as Mg or Ca, zinc atom or aluminum atom. p is 1 or 2, and q is 0 when $M_1$ is an alkali metal atom, alkali earth metal atom or zinc atom and 1 or 2 when $M_1$ is an aluminum atom.

The phosphoric acid ester metal salt represented by the formula (1) is preferably a phosphoric acid ester metal salt in which $R_1$ is a hydrogen atom and $R_2$ and $R_3$ are both tert-butyl groups.

In the formula (2), $R_4$, $R_5$ and $R_6$ are each independently a hydrogen atom or alkyl group having 1 to 12 carbon atoms. Examples of the alkyl group having 1 to 12 carbon atoms represented by $R_4$, $R_5$ and $R_6$ include methyl group, ethyl group, n-propyl group, iso-propyl group, n-butyl group, sec-butyl group, iso-butyl group, tert-butyl group, amyl group, tert-amyl group, hexyl group, heptyl group, octyl group, iso-octyl group, tert-octyl group, 2-ethylhexyl group, nonyl group, iso-nonyl group, decyl group, iso-decyl group, tert-decyl group, undecyl group, dodecyl group and tert-dodecyl group.

$M_2$ is an alkali metal atom such as Na, K or Li, alkali earth metal atom such as Mg or Ca, zinc atom or aluminum atom. p is 1 or 2, and q is 0 when $M_2$ is an alkali metal atom, alkali earth metal atom or zinc atom and 1 or 2 when $M_2$ is an aluminum atom.

The phosphoric acid ester metal salt represented by the formula (2) is preferably a phosphoric acid ester metal salt in which $R_4$ and $R_6$ are methyl groups, $R_5$ is a tert-butyl group, and $M_1$ and $M_2$ are aluminum atoms.

Commercially available phosphoric acid ester metal salts such as Adekastab NA-10, Adekastab NA-11, Adekastab NA-21, Adekastab NA-71, Adekastab NA-30 and Adekastab NA-35 of ADEKA Corporation can be effectively used for a desired purpose as the phosphoric acid ester metal salt of the present invention.

Out of these, Adekastab NA-71 which is a phosphoric acid ester aluminum salt and Adekastab NA-21 which contains a phosphoric acid ester aluminum salt and an organic aid are preferred from the viewpoint of the transparency of the film. Particulate Adekastab NA-71 and Adekastab NA-21 which have been ground and classified to have an average particle diameter of 5 μm or less so that they can be finely dispersed are particularly preferred.

The amounts of the triclinic inorganic particles (D) and the phosphoric acid ester metal salt (E) are each 0.01 to 5 parts by weight based on 100 parts by weight of the polylactic acid (A). When the amounts are smaller than 0.01 part by weight, a desired effect is rarely observed or they are too small for practical use. When the amounts are larger than 5 parts by weight, thermal decomposition occurs at the time of forming a film, or coloring by deterioration occurs disadvantageously. Therefore, the amounts are preferably 0.05 to 4 parts by weight, particularly preferably 0.1 to 3 parts by weight.

By using the triclinic inorganic particles (D) and/or the phosphoric acid ester metal salt (E) in the above weight ratio, the production of flow nonuniformity caused by the separation of the two phases can be suppressed at the time of forming the polylactic acid film of the present invention, thereby making it possible to produce a film having high transparency and heat resistance.

The triclinic inorganic particles (D) and the phosphoric acid ester metal salt (E) used in the present invention which have as small a particle diameter as possible, especially a low content of large particles having a particle diameter of more than 10 μm, are preferred from the viewpoint of the transparency of the polylactic acid film. Triclinic inorganic particles (D) and a phosphoric acid ester metal salt (E) having a particle diameter of 0.01 to 10 μm are preferably used practically. The particle diameter is more preferably 0.05 to 7 μm. When the content of large particles having a diameter of more than 10 μm is more than 20%, the haze of the polylactic acid film becomes high disadvantageously.

The triclinic inorganic particles (D) and/or the phosphoric acid ester metal salt (E) having the above particle diameter can be obtained by grinding a commercially available triclinic inorganic particles (D) and/or phosphoric acid ester metal salt (E) with a ball mill, sand mill, hammer crasher or atomizer and classifying the obtained particles with a classifier.

It is industrially difficult to reduce the particle diameter of the triclinic inorganic particles (D) and/or the phosphoric acid ester metal salt (E) to a value smaller than 0.01 μm, and it is not necessary to reduce the particle diameter to the above value for practical use. However, when the particle diameter is larger than 10 μm or the content of large particles is high, the haze of the film becomes high disadvantageously.

(Carboxyl Group Sealing Agent (Block Forming Agent))

The amount of the carboxyl group of the polylactic acid (A) is preferably 10 equivalents/$10^6$ g or less from the viewpoints of stability at the time of casting a film, the suppression of hydrolysis and the prevention of a reduction in weight average molecular weight, more preferably 5 equivalents/$10^6$ g or less, particularly preferably 2 equivalents/$10^6$ g or less.

As means of reducing the amount of the terminal carboxyl group according to application purpose, it is preferred to mix a carboxyl group sealing agent (may be referred to as "block forming agent") which is reactive with a carboxyl group from the viewpoint of stability at the time of forming a molten film and the stability in a wet heat environment of the obtained film.

The carboxyl group sealing agent can seal the terminal carboxyl group of polylactic acid, a carboxyl group formed by the decomposition reaction of polylactic acid and additives and the carboxyl group of a low molecular weight compound such as lactic acid or formic acid to stabilize a resin and can increase the resin temperature at the time of forming a film to a point high enough to suppress flow nonuniformity.

The carboxyl group sealing agent is preferably at least one compound selected from a carbodiimide compound, epoxy compound, oxazoline compound, oxazine compound and isocyanate compound, particularly preferably a carbodiimide compound.

Examples of the carbodiimide compound used in the present invention include mono- or poly-carbodiimide compounds such as dicyclohexylcarbodiimide, diisopropylcarbodiimide, dioctylcarbodiimide, octyldecylcarbodiimide, di-t-butylcarbodiimide, dibenzylcarbodiimide, diphenylcarbodiimide, N-octadecyl-N'-phenylcarbodiimide, N-benzyl-N'-phenylcarbodiimide, N-benzyl-N'-tolylcarbodiimide, di-o-toluoylcarbodiimide, di-p-toluoylcarbodiimide, bis(p-nitrophenyl)carbodiimide, bis(p-aminophenyl)carbodiimide, bis(p-hydroxyphenyl)carbodiimide, bis(p-chlorophenyl)carbodiimide, bis(o-chlorophenyl)carbodiimide, bis(o-ethylphenyl)carbodiimide, bis(p-ethylphenyl)carbodiimide, bis(o-isopropylphenyl)carbodiimide, bis(p-isopropylphenyl)carbodiimide, bis(o-isobutylphenyl)carbodiimide, bis(p-isobutylphenyl)carbodiimide, bis(2,5-dichlorophenyl)carbodiimide, p-phenylenebis(o-toluoylcarbodiimide), p-phenylenebis(cyclohexylcarbodiimide), p-phenylenebis(p-chlorophenylcarbodiimide), 2,6,2',6'-tetraisopropyldiphenylcarbodiimide, hexamethylenebis(cyclohexylcarbodiimide), ethylenebis(phenylcarbodiimide), ethylenebis(cyclohexylcarbodiimide), bis(2,6-dimethylphenyl)carbodiimide, bis(2,6-diethylphenyl)carbodiimide, bis(2-ethyl-6-isopropylphenyl)carbodiimide, bis(2-butyl-6-isopropylphenyl)carbodiimide, bis(2,6-diisopropylphenyl)carbodiimide, bis(2,6-di-t-butylphenyl)carbodiimide, bis(2,4,6-trimethylphenyl)carbodiimide, bis(2,4,6-triisopropylphenyl)carbodiimide, bis(2,4,6-tributylphenyl)carbodiimide, di-β-naphthylcarbodiimide, N-tolyl-N'-cyclohexylcarbodiimide and N-tolyl-N'-phenylcarbodiimide.

Out of these, bis(2,6-diisopropylphenyl)carbodiimide and 2,6,2',6'-tetraisopropyldiphenylcarbodiimide are particularly preferred from the viewpoint of reactivity and stability.

Out of these, dicyclohexylcarbodiimide and diisopropylcarbodiimide which can be industrially acquired are also preferably used.

Further, commercially available polycarbodiimide compounds may be advantageously used as the above polycarbodiimide compound because they do not need to be synthesized. The commercially available polycarbodiimide compounds include Carbodilite LA-1 (the trade name: Carbodilite) and HMV-8CA of Nisshinbo Industries, Inc. and the Stabackzole I, Stabackzole P and Stabackzole P100 (the trade name: Stabackzole) of Line Chemie Japan Co., Ltd.

Preferred examples of the epoxy compound include glycidyl ether compounds, glycidyl ester compounds, glycidylamine compounds, glycidylimide compounds, glycidylamide compounds and alicyclic epoxy compounds. Polylactic acid and a molded article having excellent mechanical properties, moldability, heat resistance and durability can be obtained by using the epoxy compound.

The glycidyl ether compounds include stearyl glycidyl ether, phenyl glycidyl ether, o-phenylphenyl glycidyl ether, ethylene oxide lauryl alcohol glycidyl ether, ethylene glycol diglycidyl ether, polyethylene glycol diglycidyl ether, polypropylene glycol diglycidyl ether, polytetramethylene glycol diglycidyl ether, glycerol triglycidyl ether, trimethylolpropane triglycidyl ether, pentaerythritol tetraglycidyl ether and bisphenol A diglycidyl ether type epoxy resins obtained from a condensation reaction between a bisphenol such as bis(4-hydroxyphenyl)methane and epichlorohydrin. Out of these, bisphenol A diglycidyl ether type epoxy resins are particularly preferred.

The glycidyl ester compounds include benzoic acid glycidyl esters, cyclohexanecarboxylic acid glycidyl esters, stearic acid glycidyl esters, linoleic acid glycidyl esters, linolenic acid glycidyl esters, terephthalic acid diglycidyl esters, phthalic acid diglycidyl esters, cyclohexanedicarboxylic acid diglycidyl esters, adipic acid diglycidyl esters, succinic acid diglycidyl esters, dodecanedioic acid diglycidyl esters, trimellitic acid triglycidyl esters and pyromellitic acid tetraglycidyl esters. Out of these, benzoic acid glycidyl esters and versatic acid glycidyl esters are particularly preferred.

The glycidylamine compounds include tetraglycidylamine diphenylmethane, triglycidyl-p-aminophenol, diglycidylaniline, diglycidyl toluidine, tetraglycidyl metaxylenediamine and triglycidyl isocyanurate.

The glycidylimide and glycidylamide compounds include N-glycidylphthalimide, N-glycidyl-4-methylphthalimide, N-glycidyl-3-methylphthalimide, N-glycidyl-4,5-dimethylphthalimide, N-glycidyl-3,6-dimethylphthalimide, N-glycidyl-3,4,5,6-tetrabromophthalimide, N-glycidyl-4-n-butyl-5-bromophthalimide, N-glycidylsuccinimide, N-glycidyl-1,2,3,4-tetrahydrophthalimide, N-glycidylmaleinimide, N-glycidyl-α-ethylsuccinimide, N-glycidylbenzamide, N-glycidyl-p-methylbenzamide, N-glycidylnaphthoamide and N-glycidylstearylamide. Out of these, N-glycidylphthalimide is particularly preferred.

The alicyclic epoxy compounds include 3,4-epoxycyclohexyl-3,4-cyclohexyl carboxylate, bis(3,4-epoxycyclohexylmethyl)adipate, vinyl cyclohexenediepoxide, N-methyl-4,5-epoxycyclohexane-1,2-dicarboxylic acid imide and N-phenyl-4,5-epoxycyclohexane-1,2-dicarboxylic acid imide.

Other epoxy compounds include epoxy modified fatty acid glycerides such as epoxylated soybean oil, epoxylated linseed oil and epoxylated whale oil, phenol novolak type epoxy resins and cresol novolak type epoxy resins.

Examples of the oxazoline compound used in the present invention include 2-butoxy-2-oxazoline, 2-decyloxy-2-oxazoline, 2-stearyloxy-2-oxazoline, 2-cyclohexyloxy-2-oxazoline, 2-allyloxy-2-oxazoline, 2-cresyloxy-2-oxazoline, 2-o-propylphenoxy-2-oxazoline, 2-p-phenylphenoxy-2-oxazoline, 2-methyl-2-oxazoline, 2-heptyl-2-oxazoline, 2-oleyl-2-oxazoline 2-cyclohexyl-2-oxazoline, 2-metaallyl-2-oxazoline, 2-phenyl-2-oxazoline, 2-benzyl-2-oxazoline, 2-o-propylphenyl-2-oxazoline, 2-m-propylphenyl-2-oxazoline, 2-p-phenylphenyl-2-oxazolione, 2-p-propylphenyl-2-oxazoline, 2,2'-bis(2-oxazoline), 2,2'-bis(4-methyl-2-oxazoline), 2,2'-bis(4-butyl-2-oxazoline), 2,2'-m-phenylenebis(2-oxazoline), 2,2'-p-phenylenebis(4-methyl-2-oxazoline), 2,2'-ethylenebis(2-oxazoline), 2,2'-tetramethylenebis(2-oxazoline), 2,2'-hexamethylenebis(2-oxazoline), 2,2'-octamethylenebis(2-oxazoline), 2,2'-ethylenebis(4-methyl-2-oxazoline), 2,2'-tetramethylenebis(4,4'-dimethyl-2-oxazoline), 2,2'-cyclohexylenebis(2-oxazoline) and 2,2'-diphenylenebis(4-methyl-2-oxazoline). Polyoxazoline compounds containing any one of the above compounds as a monomer unit are also included.

Examples of the oxazine compound used in the present invention include 2-methoxy-5,6-dihydro-4H-1,3-oxazine, 2-propyloxy-5,6-dihydro-4H-1,3-oxazine, 2-butoxy-5,6-dihydro-4H-1,3-oxazine, 2-hexyloxy-5,6-dihydro-4H-1,3-oxazine, 2-heptyloxy-5,6-dihydro-4H-1,3-oxazine, 2-nonyloxy-5,6-dihydro-4H-1,3-oxazine, 2-decyloxy-5,6-dihydro-4H-1,3-oxazine, 2-cyclopentyloxy-5,6-dihydro-4H-1,3-oxazine, 2-allyloxy-5,6-dihydro-4H-1,3-oxazine and 2-crotyloxy-5,6-dihydro-4H-1,3-oxazine.

Further, 2,2'-bis(5,6-dihydro-4H-1,3-oxazine), 2,2'-ethylenebis(5,6-dihydro-4H-1,3-oxazine), 2,2'-propylenebis(5,6-dihydro-4H-1,3-oxazine), 2,2'-hexamethylenebis(5,6-dihydro-4H-1,3-oxazine), 2,2'-p-phenylenebis(5,6-dihydro-4H-1,3-oxazine), 2,2'-m-phenylenebis(5,6-dihydro-4H-1,3-oxazine) and 2,2'-P,P'-diphenylenebis(5,6-dihydro-4H-1,3-oxazine) are also included. Polyoxazine compounds containing any one of the above compounds as a monomer unit are further included.

Out of the above oxazoline compounds and the above oxazine compounds, 2,2'-m-phenylenebis(2-oxazoline) and 2,2'-p-phenylenebis(2-oxazoline) are preferably selected.

As the isocyanate compound used in the present invention may be used aromatic, aliphatic and alicyclic isocyanate compounds and mixtures thereof.

Monoisocyanate compounds include phenyl isocyanate, tolyl isocyanate, dimethylphenyl isocyanate, cyclohexyl isocyanate, butyl isocyanate and naphthyl isocyanate.

Diisocyanates include 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, (2,4-tolylene diisocyanate and 2,6-tolylene diisocyanate) mixture, hexamethylene diisocyanate, cyclohexane-4,4'-diisocyanate, xylylene diisocyanate, isophorone diisocyanate, dicyclohexylmethane-4,4'-diisocyanate, methylcyclohexane diisocyanate, tetramethylxylylene diisocyanate and 2,6-diisopropylphenyl-1,4-diisocyanate.

Out of these isocyanate compounds, aromatic isocyanates such as 4,4'-diphenylmethane diisocyanate and phenyl isocyanate are preferred.

The above carboxyl group sealing agents may be used alone or in combination of two or more.

The amount of the carboxyl group sealing agent is preferably 0.01 to 10 parts by weight, more preferably 0.03 to 5 parts by weight based on 100 parts by weight of the polylactic acid (A). In the present invention, a sealing reaction catalyst may further be used.

Examples of the above compound include alkali metal compounds, alkali earth metal compounds, tertiary amines, imidazole compounds, quaternary ammonium salts, phosphine compounds, phosphonium compounds, phosphoric acid esters, organic acids and Lewis acid.

To contain the above crystallization nucleating agent and/or the carboxyl group sealing agent in the polylactic acid (A), it/they is/are contained in the polylactic acid (B) and the polylactic acid (C) in advance, contained when the polylactic acid (B) and the polylactic acid (C) are melt kneaded together, or contained at the time of casting a film after the polylactic acid (B) and the polylactic acid (C) are melt kneaded together.

Although the polylactic acid (A) can be solidified and then pelletized, it can be melt extruded into a film form without being solidified.

To mix together these agents, conventionally known means can be advantageously used. For example, the polylactic acid and the triclinic inorganic particles (D) and/or the phosphoric acid ester metal salt (E) are mixed together by means of a tumbler, twin-cylinder mixer, super mixer, Nauter mixer, Banbury mixer, kneading roll, or single-screw or double-screw extruder.

(Lubricant)

A lubricant may be contained in the polylactic acid (A) to improve the winding and traveling properties of the polylactic acid film of the present invention as long as it does not work against the object of the present invention.

This lubricant may be solid or liquid at normal temperature and preferably has a melting point or softening point of 200° C. or lower. Examples of the lubricant are given below and may be used in combination of two or more. Aliphatic hydrocarbons: liquid paraffin, microcrystalline wax, natural paraffin, synthetic paraffin, polyethylene wax and polypropylene wax;

Higher fatty acids and metal salts thereof: stearic acid, calcium stearate, hydroxystearic acid, hardened oil and sodium montanate;

Fatty acid amides: stearic acid amide, oleic acid amide, erucic acid amide, ricinoleic acid amide, behenic acid amide and methylene bisstearylamide;

Fatty acid esters: n-butyl stearate, methyl hydroxystearate, myricyl cerotinate, higher alcohol fatty acid esters and ester-based wax;

Fatty acid ketones: ketone wax;

Aliphatic higher alcohols: lauryl alcohol, stearyl alcohol, myristyl alcohol and cetyl alcohol;

Polyhydric alcohol fatty acid esters and partial esters: glycerin fatty acid esters, hydroxystearic acid triglyceride and sorbitan fatty acid esters;

Nonionic surfactants: polyoxyethylene alkyl ethers, polyoxyethylene phenyl ethers, polyoxyethylene alkyl amides and polyoxyethylene fatty acid esters;

Silicone oil: linear methyl silicone oil, methylphenyl silicone oil and modified silicone oil;

Fluorine-based surfactants: fluoroalkylcarboxylic acids, perfluoroalkylcarboxylic acids, monoperfluoroalkylethyl phosphoric acid esters and perfluoroalkylsulfonic acid salts.

These lubricants may be used alone or in combination of two or more. The lubricant is used in an amount of preferably 0.001 to 1 wt %, more preferably 0.005 to 0.5 wt % based on the polylactic acid.

[Lubricating Particles]

Lubricating particles may be contained in the polylactic acid (A) to improve the winding and traveling properties of the film as long as it does not work against the object of the present invention.

Preferred examples of the lubricating particles include inorganic particles such as silica produced by a dry process, silica produced by a wet process, zeolite, calcium carbonate, calcium phosphate, kaolin, kaolinite, clay, talc, titanium oxide, alumina, zirconia, aluminum hydroxide, calcium oxide, graphite, carbon black, zinc oxide, silicon carbide and tin oxide; and organic fine particles such as crosslinked acrylic resin particles, crosslinked polystyrene resin particles, melamine resin particles and crosslinked silicone resin particles.

These lubricating particles preferably have an average particle diameter of 0.001 to 5.0 μm and may be used alone or in combination of two or more. They may be used in an amount of 0.01 to 0.5 wt % based on the polylactic acid.

(Other Additives)

Besides these agents, an antioxidant, antistatic agent, colorant, pigment, fluorescent whitener, plasticizer, crosslinking agent, ultraviolet absorbent and other resin may be optionally added as long as they do not work against the object of the present invention.

These agents may be suitably added in a stage between the start of the polymerization of the polylactic acid and the formation of a film. As means of adding these agents, conventionally known injection methods may be used to produce agent-containing polylactic acid. For example, the polylactic acid and the agents may be mixed together by means of a tumbler, twin-cylinder mixer, super mixer, Nauter mixer, Banbury mixer, kneading roll, or single-screw or double-screw extruder.

The thus obtained polylactic acid containing triclinic inorganic particles (D) and/or a phosphoric acid ester metal salt (E), a carboxyl group sealing agent and the like may be supplied into a film forming apparatus after it is pelletized.

<Characteristic Properties of Polylactic Acid (A)>
(Stereocomplex Crystal Rate (S))

The stereocomplex crystal rate (S) obtained by the DSC measurement of the polylactic acid (A) of the present invention is 80% or more, preferably 90% or more, more preferably 95% or more.

Particularly preferably, a high melting point peak derived from stereocomplex polylactic acid which is obtained by DSC measurement becomes a single peak, that is, the stereocomplex crystal rate (S) is 100%.

(Stereo Crystallinity (K))

The polylactic acid (A) in the present invention has a stereo crystallinity (K) defined by the following equation (iv) of preferably 10 to 60%, more preferably 25 to 60%, much more preferably 30 to 55%, particularly preferably 35 to 55%.

$$K=(\Delta Hmsc-\Delta Hc)/142 \qquad (iv)$$

In the above equation, $\Delta Hmsc$ is the melting enthalpy (J/g) of the crystal melting peak of stereocomplex-phase polylactic acid. $\Delta Hc$ is the crystallization enthalpy (J/g) of polylactic acid. 142 (J/g) is the equilibrium melting enthalpy of the stereocomplex polylactic acid crystal.

(Crystal Melting Temperature)

Preferably, the polylactic acid (A) has a crystal melting temperature of 190 to 250° C. The crystal melting temperature is attributed to the melting of stereocomplex-phase polylactic acid. More preferably, the polylactic acid (A) has a crystal melting temperature of 200 to 220° C. When the crystal melting temperature falls within the above range, the polylactic acid (A) has excellent heat resistance. The crystal melting enthalpy is preferably 20 J/g or more, more preferably 30 J/g or more.

(Carboxyl Group Concentration)

The carboxyl group concentration of the polylactic acid (A) is preferably 10 eq/ton or less, more preferably 2 eq/ton or less, much more preferably 1 eq/ton or less. When the carboxyl group concentration falls within this range, the physical properties such as melt stability and wet heat stability of the polylactic acid (A) can be made excellent. To reduce the carboxyl group concentration of the polylactic acid (A) to 10 eq/ton or less, a conventionally known method of reducing the concentration of the terminal carboxyl group for a polyester composition can be advantageously employed. Stated more specifically, a method in which a terminal sealing agent such as a wet heat resistance modifier is added or a method in which the terminal carboxyl group is esterified or amidized with an alcohol or amine without adding a terminal sealing agent may be employed.

The above carboxyl group sealing agents can be advantageously used as the wet heat resistance modifier. Out of these, carbodiimide compounds can seal the carboxyl group effectively and are preferably selected from the viewpoints of the color of the polylactic acid, the promotion of the formation of a complex phase and wet heat resistance.

(Lactide Content)

The lactide content of the polylactic acid (A) is preferably 0 to 1,000 ppm, more preferably 0 to 500 ppm, much more preferably 0 to 200 ppm, particularly preferably 0 to 100 ppm. When the lactide content falls within this range, the generation of a substance causing the contamination of equipment used in the film forming process and a defect on the surface of the film can be suppressed.

The lactide content can be reduced to the above range by carrying out conventionally known lactide reduction methods alone or in combination in any stage from the time of the polymerization of poly(L-lactic acid) and poly(D-lactic acid) till the end of the production of the polylactic acid (A).

<Process for Producing a Polylactic Acid Film>
(Melt Extrusion)

The polylactic acid film of the present invention can be produced by melt extruding the polylactic acid (A) at a temperature from (Tmsc+5) to (Tmsc+50) (° C.) at a draft ratio of 2 to 80.

The polylactic acid (A) is obtained by melt kneading together the polylactic acid (B) and the polylactic acid (C) in a (B/C) weight ratio of 10/90 to 90/10. Tmsc represents the peak temperature of the melting peak of a high-melting point crystal having a crystal melting peak temperature of 190° C. or higher obtained by DSC measurement.

Melt extrusion can be carried out by extruding the molten polylactic acid (A) onto a cooling drum to form a film and bringing the film into close contact with the rotating cooling drum to be cooled.

The draft ratio (obtained by dividing the lip opening of an extrusion die by the thickness of a sheet extruded onto the cooling drum) is 2 to 80. When the draft ratio becomes small, the take-up speed of the film from the die lip becomes too low and the number of defects such as die lip streaks becomes large disadvantageously probably due to a low polymer separation speed from the die lip. From this point of view, the lower limit of the draft ratio is preferably 3 or more, more preferably 5 or more, much more preferably 9 or more, particularly preferably 15 or more. When the draft ratio becomes too high, the deformation of the polymer becomes too large at the time of separating from the die lip, whereby fluidity becomes unstable and variations in the thickness (thickness nonuniformity) of the film in the longitudinal direction (MD) become large disadvantageously. The upper limit of the draft ratio is preferably 60 or less, more preferably 40 or less, particularly preferably 30 or less.

The upper limit of the temperature of the resin to be melt extruded is preferably Tmsc+30 (° C.), more preferably Tmsc+20 (° C.). That is, the temperature of the resin to be melt extruded is a temperature at which the resin has sufficiently high flowability, that is, (Tmsc+5) to (Tmsc+50) (° C.). It is preferably 210 to 300° C. at which flow nonuniformity hardly occurs, more preferably 220 to 280° C., particularly preferably 220 to 275° C.

It is preferred that an unstretched film should be produced by cooling it with the cooling drum to be solidified while static charge is applied thereto from an electrode by a static contact method at the time of casting a film. At this point, the electrode for applying static charge is preferably a wire-like or knife-like electrode.

The surface material of the electrode is preferably platinum. That is, when film formation is continued for a long time, it is apprehended that the application capability of static electricity might be reduced by the adhesion of impurities subliming from the film to the surface of the electrode or the modification of the surface of the electrode. However, the adhesion of impurities can be prevented by blowing a high-temperature aerial flow against the electrode or nearby and installing an exhaust nozzle above the electrode. Also, the above problem can be prevented more efficiently by using platinum as the surface material of the electrode and maintaining a discharging electrode at 170 to 350° C.

The polylactic acid (A) to be supplied into the extruder is preferably dried before it is supplied into the extruder in order to suppress its decomposition at the time of melting. The water content of the polylactic acid (A) is particularly preferably 100 ppm or less.

(Stretching)

Preferably, after melt extrusion, the film is substantially not stretched, monoaxially stretched to less than 2 times or biaxially stretched at an area draw ratio of less than 4 times.

The unstretched film is preferably substantially not stretched but may be stretched in a monoaxial direction or biaxial directions as required to obtain a monoaxially stretched film or a biaxially stretched film, respectively. To obtain the monoaxially stretched film or the biaxially stretched film, the unstretched film is heated at a temperature at which the unstretched film can be stretched, that is, the glass transition temperature of polylactic acid (may be referred to as "Tg" hereinafter)) to (Tg+80) ° C. and stretched at least in a monoaxial direction.

The draw ratio is less than 2 times for the monoaxially stretched film and less than 4 times in terms of area draw ratio for the biaxially stretched film.

For biaxial stretching, it is necessary to set the area draw ratio to the above range and also to make the difference between draw ratios in the longitudinal direction and the transverse direction small for the balance between these draw ratios so as to balance shrinkage factors and elastic moduli in the longitudinal direction and the transverse direction. When the draw ratio is outside the above range, the moldability of the polylactic acid film degrades disadvantageously.

The above biaxially stretched film can be produced by a sequential stretching method in which the unstretched film is first stretched in the longitudinal direction and then in the transverse direction or a simultaneous biaxial stretching method in which the film is stretched in the longitudinal and transverse directions at the same time.

This biaxially stretched film may be further re-stretched in the longitudinal direction or the transverse direction, or both the longitudinal direction and the transverse direction to obtain a biaxially re-stretched film. However, the final draw ratio should fall within the above range.

(Heat Treatment)

The unstretched film, the monoaxially stretched film or the biaxially stretched film is heated to such an extent that its moldability is not degraded, thereby making it possible to reduce its heat shrinkage factor. It is further heated at a temperature equal to or lower than the melting peak temperature of the high-melting point crystal (Tmsc) of the polylactic acid (A) and cooled to room temperature so as to obtain a monoaxially stretched heat-set film or biaxially stretched heat-set film. That is, after melt extrusion, it is preferably heat set at 90 to 210° C.

When the heat treatment temperature is preferably set to a range from the melting peak temperature of the low-melting point crystal (Tmh) to the melting peak temperature of the high-melting point crystal (Tmsc), the film is hardly broken, the heat-setting effect becomes sufficiently large, and the obtained film has high dimensional stability.

The thus obtained unstretched film, monoaxially stretched film or biaxially stretched film may be optionally subjected to a surface activation treatment such as plasma treatment, amine treatment or corona treatment by a conventionally known method.

<Characteristic Properties of Polylactic Acid Film>

(Stereocomplex Crystal Rate (S))

The polylactic acid film of the present invention has (a) a stereocomplex crystal rate (S) defined by the following equation (i) and obtained by DSC measurement of 90% or more, preferably 90 to 100%, more preferably 95 to 100%, much more preferably 97 to 100%, particularly preferably 100%.

$$S(\%) = [\Delta Hmsc/(\Delta Hmh + \Delta Hmsc)] \times 100 \quad (i)$$

$\Delta Hmsc$ is the melting enthalpy (J/g) of the crystal melting peak of stereocomplex-phase polylactic acid. $\Delta Hmh$ is the melting enthalpy (J/g) of the crystal melting peak of homo-phase polylactic acid. The stereocomplex crystal rate (S) is a parameter indicative of the proportion of the stereocomplex polylactic acid crystal formed in the end in the heat treatment step.

In the present invention, a crystal melting peak which appears at 190° C. or higher in DSC measurement is attributed to the melting of stereocomplex-phase polylactic acid, and a crystal melting peak which appears at a temperature lower than 190° C. is attributed to the melting of homo-phase polylactic acid.

(Haze)

The polylactic acid film of the present invention has (b) a haze of 10% or less. When a film having a haze of more than 10%, strong white turbidity is perceived and transparency is low.

In the present invention, the haze is preferably 8% or less, more preferably 5% or less, much more preferably 2% or less, particularly preferably 1.6% or less, ideally 1% or less.

As described above, the haze is preferably as low as possible from the viewpoint of transparency. To reduce the haze, the film must be made thin and the amount of a lubricant must be made small, whereby the handling ease of the film tends to become low. When the film is made thin to enhance its transparency, a polylactic acid film for molding is apt to be broken at the time of molding. From this point of view, the lower limit of the haze is preferably 0.1% or more, more preferably 0.5% or more, much more preferably 3% or more.

(Change in Haze After 10 Minutes of Heat Treatment at 140° C.)

The polylactic acid film of the present invention has (c) a haze change ((haze after heat treatment)−(haze before heat treatment)) of 5% or less when it is heated at 140° C. for 10 minutes. When the haze change falls within this range, whitening after heat molding is suppressed. From this point of view, the haze change is preferably 4% or less, more preferably 3% or less, particularly preferably 1% or less.

(Change in Haze After 5 Hours of Heat Treatment at 90° C.)

Preferably, the polylactic acid film of the present invention has a haze change (difference between haze after heat treatment and haze before heat treatment) of 2% or less when it is heated at 90° C. for 5 hours. The polylactic acid film of the present invention is useful as an optical film which requires heat resistance. The haze change is more preferably 1.5% or less, much more preferably 1% or less, particularly preferably 0.3% or less. To set the haze change to the above numerical range, the stereocomplex crystal rate (S), stretching conditions and heat treatment conditions of the film should be suitably set.

(Thickness)

The thickness of the polylactic acid film of the present invention is preferably 1 to 300 μm.

The thickness of the film is 20 to 120 μm, preferably 40 to 120 μm. When the thickness of the film falls within the above numerical range, the film has excellent handling ease. Also, it is easy to achieve the haze specified by the present invention. From this point of view, the thickness of the film is more preferably 30 to 100 μm, much more preferably 60 to 100 μm, particularly preferably 30 to 90 μm, most preferably 70 to 90 μm.

(Stereo Crystallinity (K))

The polylactic acid film of the present invention has a stereo crystallinity (K) defined by the following equation (iv) of preferably 10 to 60%, more preferably 25 to 60%, much more preferably 30 to 55%, particularly preferably 35 to 55%.

$$K=(\Delta Hmsc-\Delta Hc)/142 \quad (iv)$$

ΔHmsc is the melting enthalpy (J/g) of the crystal melting peak of stereocomplex-phase polylactic acid. ΔHc is the crystallization enthalpy (J/g) of polylactic acid. 142 (J/g) is the equilibrium melting enthalpy of the stereocomplex polylactic acid crystal.

(Crystal Melting Peak)

The polylactic acid film of the present invention has a crystal melting peak at 190° C. or higher in differential scanning calorimeter (DSC) measurement. This crystal melting peak is attributed to the melting of stereocomplex-phase polylactic acid. In the present invention, the polylactic acid film of the present invention has a crystal melting peak at preferably 190 to 250° C., more preferably 200 to 220° C. When the crystal melting peak is existent at the above temperature range, the polylactic acid film has excellent heat resistance.

(Storage Elastic Modulus: E')

The polylactic acid film of the present invention does not have a minimum value of storage elastic modulus (E') measured by dynamic viscoelasticity (DMA) measurement at a temperature range from normal temperature (25° C.) to 150° C. and preferably has a value larger than $0.5 \times 10^8$ Pa.

Even when the polylactic acid film of the present invention is heated at a temperature of about 150° C. required for the production process of a polarizing film, it does not have a minimum value of storage elastic modulus (E'). Therefore, it is excellent in dimensional stability. Since the polylactic acid film has a storage elastic modulus (E') larger than $0.5 \times 10^8$ Pa, it is hardly deformed by external force, its phase differences hardly change, and it can show high processability in the production process of a polarizing film or a polarizing plate.

(Photoelastic Coefficient)

The absolute value of the photoelastic coefficient of the polylactic acid film of the present invention is preferably less than $10 \times 10^{-12}$/Pa, more preferably less than $8 \times 10^{-12}$/Pa, much more preferably less than $5 \times 10^{-12}$/Pa, particularly preferably less than $3 \times 10^{-12}$/Pa.

There are many documents concerning the photoelastic coefficient (CR) (refer, for example, to Non-patent Document 2) and the photoelastic coefficient is a value defined by the following equations. As the value of photoelastic coefficient is closer to "0", a change in birefringence by external force becomes smaller and a change in birefringence designed for each application becomes smaller.

$$CR=\Delta n/\sigma R$$

$$\Delta n = nx - ny$$

CR is a photoelastic coefficient, σR is a stretch stress, Δn is a birefringence difference, nx is a refractive index in the stretching direction, and ny is a refractive index in a direction orthogonal to the stretching direction.

(Other Layers)

A hard coat layer, forward scattering layer, antiglare layer, gas barrier layer, lubricating layer, antistatic layer, under coat layer, protective layer, antireflection layer and optically anisotropic layer may be used in combination in the polylactic acid film of the present invention to further improve its functions. What are described, for example, in JP-A 2008-233655 may be used as the hard coat layer, forward scattering layer and antiglare layer.

(Application Purposes)

Since the polylactic acid film of the present invention has high transparency and high heat resistance, it is useful for packaging films, capacitor films (such as films having a thickness of 3 μm or less), printer ribbon films (such as films having a thickness of about 5 μm), thermosensitive intaglio printing films, magnetic recording films (such as those for QIC tapes: ¼-inch film tapes for computer recoding) and nonglare films (such as films having a thickness of 50 μm or less). Particularly, a film having a haze of 4% or less is useful for optical purposes. Since it is excellent in heat resistance and moldability, even when it is used for press molding, vacuum molding, pneumatic molding and in-mold molding, whitening caused by heating hardly occurs advantageously.

As for optical purposes, it can be used as a protective film for polarizing plates, an antireflection film or an antiglare film. Since the polylactic acid film has a low photoelastic modulus, that is, little change in optical properties by stress applied to the end of a large-sized liquid crystal display screen, a uniform screen is obtained. When the polylactic acid film is used as a protective film for polarizing plates, its birefringence can be suppressed, thereby making it possible to obtain optical properties stably.

Further, as the refractive index of the polylactic acid film of the present invention tends to be hardly changed by draw ratio, retardation nonuniformity caused by stretching nonuniformity hardly occurs.

It is possible to completely dry polyvinyl alcohol (PVA) which is contained in an aqueous cast film due to the steam permeability of the polylactic acid film and therefore, the polylactic acid film can be used as a substitute for triacetyl cellulose (TAC).

Further, when the polylactic acid film of the present invention is used as a food packaging film, its content is visible, can be thermally sterilized and can be heated in a microwave oven as it has high heat resistance.

<Preferred Polylactic Acid Films>

The following polylactic acid films (1) to (3) are given as preferred examples of the polylactic acid film of the present invention. The polylactic acid films (1) to (3) can be produced by adjusting stretching conditions and heat treatment conditions.

In these examples, the weight average molecular weight (Mw) of the polylactic acid (A) is preferably selected from a range of 100,000 to 500,000 so as to obtain moldability and physical properties at the same time. It is more preferably 100,000 to 300,000, much more preferably 110,000 to 250,000.

The stereocomplex crystal rate (S) of the polylactic acid (A) is preferably 90% or more. That is, it is preferred that the stereocomplex phase should be fully formed in the polylactic acid (A). When the polylactic acid (A) has a stereocomplex crystal rate (S) within the above range, the heat dimensional stability and high-temperature mechanical properties of the polylactic acid film can be made high.

<Polylactic Acid Film (1)>

The polylactic acid film (1) is an unstretched or stretched film having a draw ratio of 1.06 or less.

The phase difference (Re) in the plane direction of the polylactic acid film (1) is 20 nm or less (d-1). The phase difference (Re) in the plane direction is preferably 13 nm or less, more preferably 8 nm or less, much more preferably 4 nm or less.

The phase difference (Rth) in the thickness direction of the polylactic acid film (1) is less than 25 nm (d-1). The phase difference (Rth) in the thickness direction is preferably 20 nm or less, more preferably 13 nm or less, much more preferably 8 nm or less, particularly preferably 4 nm or less.

The phase difference (Re) in the plane direction and the phase difference (Rth) in the thickness direction are each a product of a birefringence difference Δn and a thickness d (nm) and defined by the following equations (ii) and (iii), respectively.

$$Re = (nx - ny) \times d \quad (ii)$$

$$Rth = ((nx + ny)/2 - nz) \times d \quad (iii)$$

nx is a refractive index in the longitudinal direction. ny is a refractive index in the transverse direction. nz is a refractive index in the thickness direction. d is a thickness (nm).

When the phase difference (Re) in the plane direction and the phase difference (Rth) in the thickness direction fall within the above numerical ranges at the same time, the polylactic acid film (1) of the present invention can be advantageously used as a phase difference film. Especially, it can be advantageously used as an optical correction film for IPS-mode liquid crystal displays. It can become a substitute for TAC and can be advantageously used as a protective film for polarizing plates.

The above phase difference (Re) in the plane direction and the above phase difference (Rth) in the thickness direction can be achieved by setting the draw ratio, the stretching temperature and the heat treatment temperature to the following values.

The polylactic acid film (1) has (e) a heat shrinkage factor in the longitudinal direction (MD) and the transverse direction (TD) of 4% when it is heated at 90° C. for 5 hours. The heat shrinkage factor is preferably 3% or less, more preferably 2% or less, particularly preferably 1% or less. The above heat shrinkage factor can be achieved by setting the following stretching conditions and heat treatment conditions. It is especially important to carry out a heat treatment.

The thickness of the polylactic acid film (1) is preferably 1 to 300 μm. The thickness is preferably large from the viewpoint of preventing creasing at the time of handling, more preferably 10 μm or more, much more preferably 20 μm or more, particularly preferably 30 μm or more. The thickness is advantageously small from the viewpoint of transparency, preferably 200 μm or less, more preferably 150 μm or less, particularly preferably 100 μm or less.

(Stretching)

The polylactic acid film (1) is preferably a not stretched film (unstretched film) so as to achieve a desired phase difference (Re) in the plane direction and a desired phase difference (Rth) in the thickness direction. The polylactic acid film (1) may be stretched at a low draw ratio so as to obtain a desired phase difference (Re) in the plane direction and a desired phase difference (Rth) in the thickness direction.

To stretch the unstretched film at a low draw ratio, it may be monoaxially stretched in a machine direction (may be referred to as "MD, vertical or longitudinal direction" hereinafter) or a direction orthogonal to the machine direction (may be referred to as "TD, crosswise or transverse direction" hereinafter). A biaxially stretched film can be produced by stretching the unstretched film in accordance with a sequential biaxial stretching method in which roll stretching and tenter stretching are carried out sequentially, a simultaneous biaxial stretching method in which tenter stretching is carried out, or a biaxial stretching method in which tubular stretching is carried out.

In the case of monoaxial stretching, the upper limit of the draw ratio is 1.06 times or less, preferably 1.04 times or less. The lower limit of the draw ratio is more than 1.00 time. By setting the draw ratio to this range, the phase difference (Re) in the plane direction and the phase difference (Rth) in the thickness direction can be set to the above ranges, respectively. Also, a film having excellent characteristic properties and improved characteristic properties by stretching while maintaining the characteristic properties of the unstretched film to a certain extent can be obtained.

In the case of biaxial stretching, the upper limit of the area draw ratio (draw ratio in longitudinal direction×draw ratio in transverse direction) is 1.06 times or less, preferably 1.04 times or less. The lower limit of the area draw ratio is more than 1.00 time. By setting the area draw ratio to this range, the phase difference (Rth) in the thickness direction can be set to the above range.

Further, as for the draw ratios in the longitudinal direction and the transverse direction, the upper limit of the draw ratio in the longitudinal direction is preferably less than 1.04 times, particularly preferably 1.034 times or less. The lower limit of the draw ratio is more than 1.00 time.

The upper limit of the draw ratio in the transverse direction is preferably less than 1.03 times, particularly preferably 1.024 times or less. The lower limit of the draw ratio is more than 1.00 time. By setting the draw ratios in the longitudinal direction and the transverse direction to these ranges, the phase difference (Re) in the plane direction and the phase difference (Rth) in the thickness direction can be set to the above ranges, respectively.

The upper limit of the absolute value of the difference between the draw ratio in the longitudinal direction and the draw ratio in the transverse direction is preferably less than 0.02, particularly preferably 0.01 or less. The absolute value of the difference is preferably close to 0. By setting the absolute value of the difference between the draw ratio in the longitudinal direction and the draw ratio in the transverse direction to this range, the phase difference (Re) in the plane direction can be set to the above range.

The stretching temperature is preferably selected from a range from the glass transition temperature (Tg, unit: ° C.) of the polylactic acid (A) to the crystallization temperature (Tc, unit: ° C.). A temperature range as close to Tc as possible, that is, a temperature range at which the crystallization of the polylactic acid (A) hardly proceeds is preferably adopted, whereby the phase difference (Re) in the plane direction and the phase difference (Rth) in the thickness direction tend to become small.

Since the molecular chain is fixed at a temperature lower than Tg, it is difficult to carry out the stretching operation advantageously and to set the phase difference (Re) in the plane direction and the phase difference (Rth) in the thickness direction at the above draw ratio range to the numerical ranges specified by the present invention, respectively. At a temperature higher than Tc, the crystallization of the polylactic acid (A) proceeds, and it may be difficult to carry out the stretching step smoothly in this case as well.

Therefore, the lower limit of the stretching temperature is preferably Tg+5° C. or higher, more preferably Tg+10° C. or higher. The upper limit of the stretching temperature is preferably Tc−5° C. or lower, more preferably Tc−10° C. or lower.

In the present invention, the stretching temperature is preferably selected from the above temperature range so as to obtain the physical properties of the film and the stabilization of the stretching step at the same time. Since the physical properties of the film and the stabilization of the stretching step conflict with each other, the upper limit of the stretching temperature must be suitably set in consideration of the characteristic properties of the equipment.

Further, in the stretching step, the temperature of a stretching end portion is preferably 1° C. or more higher than the temperature of a stretching start portion from the viewpoint of preventing the thickness nonuniformity of the film. From this point of view, the temperature of the stretching end portion is more preferably 2° C. or more, much more preferably 3° C. or more, particularly preferably 4° C. or more higher than the temperature of the stretching start portion. When the temperature of the stretching end portion is much higher than the temperature of the stretching start portion, differences in physical properties in the transverse direction of the film tend to appear. From this point of view, the temperature difference between the stretching end portion and the stretching start portion is preferably 30° C. or less, more preferably 20° C. or less, much more preferably 15° C. or less, particularly preferably 10° C. or less.

(Heat Treatment)

The above unstretched film, monoaxially stretched film and biaxially stretched film are preferably heated at 90 to 210° C. The heat treatment corresponds to so-called "heat setting". This heat treatment promotes the crystallization of complex-phase polylactic acid and can reduce the heat shrinkage factor of the obtained optical polylactic acid film advantageously. From this point of view, the lower limit of the heat treatment temperature is preferably 100° C., more preferably 120° C. or higher, much more preferably 140° C. or higher. When the heat treatment temperature becomes too high and close to the melting temperature of the polylactic acid (A), the mechanical properties such as breaking strength of the polylactic acid film tend to degrade and the thickness nonuniformity of the film tends to become worse. From this point of view, the upper limit of the heat treatment temperature is preferably 200° C. or lower, more preferably 180° C. or lower.

The heat treatment time is preferably 1 second to 30 minutes. To enhance the effect of improving heat dimensional stability, when the heat treatment temperature is high, a relatively short heat treatment time is required and when the heat treatment temperature is low, a relatively long heat treatment time is required. For example, a resin composition having a Tc of 140° C. must have a heat treatment time of at least 30 seconds at a heat treatment temperature of 140° C. However, the polylactic acid film which has been heated at 150° C. for 10 seconds or at 90° C. for 5 hours can have a heat shrinkage factor of 4% or less.

To adopt the above heat treatment at the above draw ratio range is one of preferred means of setting the phase difference (Re) in the plane direction and the phase difference (Rth) in the thickness direction to the numerical ranges specified by the present invention.

A film obtained by carrying out the above heat treatment has excellent transparency and heat resistance. Stated more specifically, a change in haze after 5 hours of a heat treatment at 90° C. can be made small.

The film obtained as described above may be optionally subjected to a surface activation treatment such as plasma treatment, amine treatment or corona treatment by conventionally known methods.

(Application Purposes of Polylactic Acid Film (1))

The polylactic acid film (1) is useful as a phase difference film. Since the polylactic acid film (1) has a phase difference (Re) in the plane direction of 20 nm or less and a phase difference (Rth) in the thickness direction of less than 25 nm, it is useful as an optical correction film for IPS-mode liquid crystal displays. As the polylactic acid film (1) comprises stereocomplex polylactic acid and its phase differences can be finely controlled by stretching conditions and heat treatment conditions, when it is used in a liquid crystal display, it can exhibit excellent optical properties.

The polylactic acid film (1) may also be used as a protective film for polarizing plates. The protective film for polarizing plates is used as a constituent member of a polarizing plate and laminated on both sides or one side of a polarizing film (such as a PVA-based film having a high degree of polymerization to which a two-tone pigment or two-tone dye has been impregnated or adsorbed) so as to improve the strength of the polarizing film, protect it from heat and water and prevent the deterioration of its quality.

For these application purposes, the phase difference (Re) in the plane direction is more preferably 10 nm or less, much more preferably 5 nm or less. The phase difference (Rth) in the thickness direction is preferably higher, specifically 20 nm or more.

The phase difference film and the protective film for polarizing plates both of which are composed of the polylactic acid film (1) may be used as a constituent member of a polarizing plate in liquid crystal displays, plasma displays, organic EL displays, field emission displays and rear projection TV displays. The phase difference film and the protective film for polarizing plates may be optionally subjected to surface functioning treatments such as antireflection treatment, transparent conducting treatment, electromagnetic shielding treatment, gas barrier treatment and antifouling treatment.

The invention of the polylactic acid film (1) includes the following inventions.

1. An optical polylactic acid film comprising a resin composition containing polylactic acid (A) which comprises a poly(L-lactic acid) component and a poly(D-lactic acid) component and having a crystal melting peak at 190° C. or higher in differential scanning calorimeter (DSC) measurement and a stereocomplex crystal rate (S) defined by the following equation (i) of 90% or more, wherein the polylactic acid film has a phase difference (Re) in the plane direction defined by the following equation (ii) of 20 nm or less, a phase difference (Rth) in the thickness direction defined by the following equation (iii) of less than 25 nm and a heat shrinkage factor in longitudinal and transverse directions of 4% or less when it is heated at 90° C. for 5 hours.

$$S(\%) = [\Delta Hmsc/(\Delta Hmh + \Delta Hmsc)] \times 100 \qquad (i)$$

(ΔHmsc is the melting enthalpy (J/g) of the crystal melting peak of stereocomplex-phase polylactic acid. ΔHmh is the melting enthalpy (J/g) of the crystal melting peak of homo-phase polylactic acid.)

$$Re = (nx - ny) \times d \qquad (ii)$$

$$Rth = ((nx+ny)/2 - nz) \times d \qquad (iii)$$

(nx is a refractive index in the longitudinal direction of the film. ny is a refractive index in the transverse direction of the film. nz is a refractive index in the thickness direction of the film. d is the thickness (nm) of the film.)

2. The optical polylactic acid film of the above paragraph 1 which comprises a steric accelerator and/or a block forming agent.

3. The optical polylactic acid film of the above paragraph 2, wherein the steric accelerator is a phosphoric acid metal salt and the block forming agent is a compound having at least one group selected from the group consisting of epoxy group, oxazoline group, oxazine group, isocyanate group, ketene group and carbodiimide group in the molecule.
4. The optical polylactic acid film of any one of the above paragraphs 1 to 3 which has a haze of 2% or less and a haze change before and after 5 hours of a heat treatment at 90° of 2% or less.
5. The optical polylactic acid film of any one of the above paragraphs 1 to 4 which is used as a phase difference film.
6. The optical polylactic acid film of the above paragraph 5 which is used as an optical correction film for IPS-mode liquid crystal displays.
7. A phase difference film which is composed of the optical polylactic acid film of any one of the above paragraphs 1 to 6.
8. A polarizing plate which consists of the phase difference film of the above paragraph 7 and a polarizing film.
9. A liquid crystal display comprising the phase difference film of the above paragraph 7.
10. A process for producing the optical polylactic acid film of the above paragraph 1, comprising the steps of:
    obtaining an unstretched film of a resin composition; and heating the film at a temperature of 90 to 210° C.

<Polylactic Acid Film (2)>

The phase difference (Re) in the plane direction of the polylactic acid film (2) is 20 nm or less (d-2). The phase difference (Re) in the plane direction is preferably 10 nm or less, more preferably 5 nm or less, much more preferably 4 nm or less.

The phase difference (Rth) in the thickness direction of the polylactic acid film (2) is 25 to 90 nm (d-2). The upper limit of the phase difference (Rth) in the thickness direction is preferably 80 nm or less, more preferably 70 nm or less, particularly preferably 60 nm or less. The lower limit of the phase difference (Rth) in the thickness direction is preferably 30 nm or more, more preferably 35 nm or more, much more preferably 40 nm or less, particularly preferably 50 nm or more.

The phase difference (Re) in the plane direction and the phase difference (Rth) in the thickness direction are each a product of a birefringence difference $\Delta n$ and a thickness d (nm) and defined by the above equations (ii) and (iii), respectively.

When the phase difference (Re) in the plane direction and the phase difference (Rth) in the thickness direction fall within the above numerical ranges at the same time, the polylactic acid film (2) can become a substitute for TAC and can be advantageously used as a protective film for polarizing plates.

The above phase difference (Re) in the plane direction and the above phase difference (Rth) in the thickness direction can be achieved by setting the draw ratio, the stretching temperature and the heat treatment temperature to the following values.

The polylactic acid film (2) has (e) a heat shrinkage factor in the longitudinal direction (MD) and the transverse direction (TD) of 4% or less when it is heated at 90° C. for 5 hours. The heat shrinkage factor is preferably 3% or less, more preferably 2% or less, particularly preferably 1% or less. The above heat shrinkage factor can be achieved by setting the following stretching conditions and heat treatment conditions. It is especially important to carry out a heat treatment.

The thickness of the polylactic acid film (2) is preferably 1 to 300 μm. The thickness is preferably large from the viewpoint of preventing creasing at the time of handling, more preferably 10 μm or more, much more preferably 20 μm or more, particularly preferably 30 μm or more. The thickness is advantageously small from the viewpoint of transparency, preferably 200 μm or less, more preferably 150 μm or less, particularly preferably 100 μm or less.

(Stretching)

The polylactic acid film (2) is preferably stretched at a low draw ratio to obtain a desired phase difference (Re) in the plane direction and a desired phase difference (Rth) in the thickness direction.

To stretch an unstretched film at a low draw ratio, it may be monoaxially stretched in a machine direction (may be referred to as "MD, vertical or longitudinal direction" hereinafter) or a direction orthogonal to the machine direction (may be referred to as "TD, crosswise or transverse direction" hereinafter). A biaxially stretched film can be produced by stretching the unstretched film in accordance with a sequential biaxial stretching method in which roll stretching and tenter stretching are carried out sequentially, a simultaneous biaxial stretching method in which tenter stretching is carried out, or a biaxial stretching method in which tubular stretching is carried out.

In the case of monoaxial stretching, the upper limit of the draw ratio is 1.20 times or less, preferably 1.10 times or less. The lower limit of the draw ratio is more than 1.00 time, preferably more than 1.04 times, particularly preferably more than 1.06 times. By setting the draw ratio to this range, the phase difference (Re) in the plane direction and the phase difference (Rth) in the thickness direction can be set to the above ranges, respectively.

In the case of biaxial stretching, the upper limit of the area draw ratio (draw ratio in longitudinal direction×draw ratio in transverse direction) is 1.20 times or less, preferably 1.10 times or less. The lower limit of the area draw ratio is more than 1.00 time, preferably more than 1.04 times, particularly preferably 1.06 times. By setting the area draw ratio to this range, the phase difference (Rth) in the thickness direction can be set to the above range.

Further, as for the draw ratios in the longitudinal direction and the transverse direction, the upper limit of the draw ratio in the longitudinal direction is preferably less than 1.20 times, particularly preferably 1.10 times or less. The lower limit of the draw ratio is more than 1.00 time, preferably 1.035 times or more, particularly preferably 1.04 times or more.

The upper limit of the draw ratio in the transverse direction is preferably less than 1.20 times, particularly preferably 1.10 times or less. The lower limit of the draw ratio is more than 1.00 time, preferably 1.025 times or more, particularly preferably 1.03 times or more. By setting the draw ratios in the longitudinal direction and the transverse direction to these ranges, the phase difference (Re) in the plane direction and the phase difference (Rth) in the thickness direction can be set to the above ranges, respectively.

The upper limit of the absolute value of the difference between the draw ratio in the longitudinal direction and the draw ratio in the transverse direction is preferably less than 0.02, particularly preferably 0.01 or less. The absolute value of the difference is preferably close to 0. By setting the absolute value of the difference between the draw ratio in the longitudinal direction and the draw ratio in the transverse direction to this range, the phase difference (Re) in the plane direction can be set to the above range.

The stretching temperature is preferably selected from a range from the glass transition temperature (Tg, unit: ° C.) of the polylactic acid (A) to the crystallization temperature (Tc, unit: °C.). A temperature range as close to Tc as possible, that is, a temperature range at which the crystallization of the polylactic acid (A) hardly proceeds is preferably adopted, whereby the phase difference (Re) in the plane direction and the phase difference (Rth) in the thickness direction tend to become small.

Since the molecular chain is fixed at a temperature lower than Tg, it is difficult to carry out the stretching operation advantageously and to set the phase difference (Re) in the plane direction and the phase difference (Rth) in the thickness direction at the above draw ratio range to the numerical ranges specified by the present invention, respectively. At a temperature higher than Tc, the crystallization of the polylactic acid (A) proceeds, and it may be difficult to carry out the stretching step smoothly in this case as well.

Therefore, the lower limit of the stretching temperature is preferably Tg+5° C. or higher, more preferably Tg+10° C. or higher. The upper limit of the stretching temperature is preferably Tc−5° C. or lower, more preferably Tc−10° C. or lower.

In the present invention, the stretching temperature is preferably selected from the above temperature range so as to obtain the physical properties of the film and the stabilization of the stretching step at the same time. Since the physical properties of the film and the stabilization of the stretching step conflict with each other, the upper limit of the stretching temperature must be suitably set in consideration of the characteristic properties of the equipment.

Further, in the stretching step, the temperature of a stretching end portion is preferably 1° C. or more higher than the temperature of a stretching start portion from the viewpoint of preventing the thickness nonuniformity of the film. From this point of view, the temperature of the stretching end portion is more preferably 2° C. or more, much more preferably 3° C. or more, particularly preferably 4° C. or more higher than the temperature of the stretching start portion. When the temperature of the stretching end portion is much higher than the temperature of the stretching start portion, differences in physical properties in the transverse direction of the film tend to appear. From this point of view, the temperature difference between the stretching end portion and the stretching start portion is preferably 30° C. or less, more preferably 20° C. or less, much more preferably 15° C. or less, particularly preferably 10° C. or less.

(Heat Treatment)

The above monoaxially stretched film and biaxially stretched film are preferably heated at 90 to 210° C. The heat treatment corresponds to so-called "heat setting". This heat treatment promotes the crystallization of complex-phase polylactic acid and can reduce the heat shrinkage factor of the obtained optical polylactic acid film advantageously. From this point of view, the lower limit of the heat treatment temperature is preferably 100° C. or higher, more preferably 120° C. or higher, much more preferably 140° C. or higher. When the heat treatment temperature becomes too high and close to the melting temperature of the polylactic acid (A), the mechanical properties such as breaking strength of the polylactic acid film tend to degrade and the thickness nonuniformity of the film tends to become worse. From this point of view, the upper limit of the heat treatment temperature is preferably 200° C. or lower, more preferably 180° C. or lower.

The heat treatment time is preferably 1 second to 30 minutes. To enhance the effect of improving heat dimensional stability, when the heat treatment temperature is high, a relatively short heat treatment time is required and when the heat treatment temperature is low, a relatively long heat treatment time is required. For example, a resin composition having a Tc of 140° C. must have a heat treatment time of at least 30 seconds at a heat treatment temperature of 140° C. However, the polylactic acid film which has been heated at 150° C. for 10 seconds or at 90° C. for 5 hours can have a heat shrinkage factor of 4% or less.

To adopt the above heat treatment at the above draw ratio range is one of preferred means of setting the phase difference (Re) in the plane direction and the phase difference (Rth) in the thickness direction to the numerical ranges specified by the present invention.

A film obtained by carrying out the above heat treatment has excellent transparency and heat resistance. Stated more specifically, a change in haze after 5 hours of a heat treatment at 90° C. can be made small.

The film obtained as described above may be optionally subjected to a surface activation treatment such as plasma treatment, amine treatment or corona treatment by conventionally known methods.

(Application Purposes of Polylactic Acid Film (2))

Since the polylactic acid film (2) has a phase difference (Re) in the plane direction of 20 nm or less and a phase difference (Rth) in the thickness direction of 25 to 90 nm, it is useful as a protective film for polarizing plates. The protective film for polarizing plates is used as a constituent member of a polarizing plate and laminated on both sides or one side of a polarizing film (such as a PVA-based film having a high degree of polymerization to which a two-tone pigment or two-tone dye has been impregnated or adsorbed) so as to improve the strength of the polarizing film, protect it from heat and water and prevent the deterioration of its quality.

For these application purposes, the phase difference (Re) in the plane direction is preferably 10 nm or less, more preferably 5 nm or less. The lower limit of the phase difference (Rth) in the thickness direction is preferably 30 nm or more, more preferably 40 nm or more, particularly preferably 50 nm or more. The upper limit is preferably 80 nm or less, more preferably 70 nm or less, particularly preferably 60 nm or less.

The protective film for polarizing plates which is composed of the polylactic acid film (2) may be used in liquid crystal displays, plasma displays, organic EL displays, field emission displays and rear projection TV displays as a constituent member of a polarizing plate. The protective film for polarizing plates may be optionally subjected to surface functioning treatments such as antireflection treatment, transparent conducting treatment, electromagnetic shielding treatment, gas barrier treatment and antifouling treatment.

The invention of the polylactic acid film (2) includes the following inventions.

1. An optical polylactic acid film comprising a resin composition containing polylactic acid (A) which comprises a poly(L-lactic acid) component and a poly(D-lactic acid) component and having a crystal melting peak at 190° C. or higher in differential scanning calorimeter (DSC) measurement and a stereocomplex crystal rate (S) defined by the following equation (i) of 90% or more, wherein
the polylactic acid film has a phase difference (Re) in the plane direction defined by the following equation (ii) of 20 nm or less, a phase difference (Rth) in the thickness direction defined by the following equation (iii) of 25 to 90 nm and a heat shrinkage factor in longitudinal and transverse directions of 4% or less when it is heated at 90° C. for 5 hours.

$$S(\%) = [\Delta Hmsc/(\Delta Hmh + \Delta Hmsc)] \times 100 \quad \text{(i)}$$

(ΔHmsc is the melting enthalpy (J/g) of the crystal melting peak of stereocomplex-phase polylactic acid. ΔHmh is the melting enthalpy (J/g) of the crystal melting peak of homo-phase polylactic acid.)

$$Re=(nx-ny)\times d \quad (ii)$$

$$Rth=((nx+ny)/2-nz)\times d \quad (iii)$$

(nx is a refractive index in the longitudinal direction of the film. ny is a refractive index in the transverse direction of the film. nz is a refractive index in the thickness direction of the film. d is the thickness (nm) of the film.)

2. The optical polylactic acid film of the above paragraph 1 which comprises a steric accelerator and/or a block forming agent.
3. The optical polylactic acid film of the above paragraph 2, wherein the steric accelerator is a phosphoric acid metal salt and the block forming agent is a compound having at least one group selected from the group consisting of epoxy group, oxazoline group, oxazine group, isocyanate group, ketene group and carbodiimide group in the molecule.
4. The optical polylactic acid film of any one of the above paragraphs 1 to 3 which has a haze of 2% or less and a haze change before and after 5 hours of a heat treatment at 90° of 2% or less.
5. The optical polylactic acid film of anyone of the above paragraphs 1 to 4 which is used as a protective film for polarizing plates.
6. A protective film for polarizing plates which is composed of the optical polylactic acid film in any one of the above paragraphs 1 to 5.
7. A polarizing plate which consists of the protective film for polarizing plates of the above paragraph 6 and a polarizing film.
8. A liquid crystal display comprising the protective film for polarizing plates of the above paragraph 6.
9. A process for producing the optical polylactic acid film of the above paragraph 1, comprising the steps of:
   obtaining an unstretched film of a resin composition; and
   heating the film at a temperature of 90 to 210° C.

<Polylactic Acid Film (3)>

The phase difference (Re) in the plane direction of the polylactic acid film (3) is more than 20 nm and 130 nm or less (d–3). The upper limit of the phase difference (Re) in the plane direction is preferably 70 nm or less, more preferably 60 nm or less, much more preferably 50 nm or less. The lower limit of the phase difference (Re) in the plane direction is preferably 30 nm or more, more preferably 35 nm or more, particularly preferably 40 nm or more. When the phase difference (Re) in the plane direction is large and the film is used as an optical correction sheet, it has excellent view angle characteristics.

The phase difference (Rth) in the thickness direction of the polylactic acid film (3) is 90 to 350 nm (d–3). The upper limit of the phase difference (Rth) in the thickness direction is preferably 260 nm or less, more preferably 160 nm or less, particularly preferably 130 nm or less. The lower limit of the phase difference (Rth) in the thickness direction is preferably 90 nm or more, more preferably 100 nm or more, much more preferably 110 nm or less, particularly preferably 120 nm or more.

The upper limit of the (Rth/Re) ratio of the phase difference in the thickness direction to the phase difference in the plane direction is preferably 4.8 or less, more preferably 4.0 or less, much more preferably 3.5 or less, particularly preferably 3.0 or less. When Rth/Re is small and the film is used as an optical correction sheet, it has excellent color shift characteristics. The lower limit of Rth/Re is preferably 0.8 or more, more preferably 1.2 or more, much more preferably 1.8 or more, particularly preferably 2.4 or more.

The phase difference (Re) in the plane direction and the phase difference (Rth) in the thickness direction are each a product of a birefringence difference Δn and a thickness d (nm) and defined by the above equations (ii) and (iii), respectively.

When the phase difference (Re) in the plane direction and the phase difference (Rth) in the thickness direction fall within the above ranges at the same time, the polylactic acid film (3) can be advantageously used as a phase difference film. Particularly, it can become a substitute for VA-TAC and can be advantageously used as an optical correction film for VA-mode liquid crystal displays.

The above phase difference (Re) in the plane direction and the above phase difference (Rth) in the thickness direction can be achieved by setting the draw ratio, the stretching temperature and the heat treatment temperature to the following values.

The polylactic acid film (3) has (e) a heat shrinkage factor in the longitudinal direction (MD) and the transverse direction (TD) of 4% or less when it is heated at 90° C. for 5 hours. The heat shrinkage factor is preferably 3% or less, more preferably 2% or less, particularly preferably 1% or less. The above heat shrinkage factor can be achieved by setting the following stretching conditions and heat treatment conditions. It is especially important to carry out a heat treatment.

The thickness of the polylactic acid film (3) is preferably 1 to 300 μm. The thickness is preferably large from the viewpoint of preventing creasing at the time of handling, more preferably 10 μm or more, much more preferably 20 μm or more, particularly preferably 30 μm or more. The thickness is advantageously small from the viewpoint of transparency, preferably 200 μm or less, more preferably 150 μm or less, particularly preferably 100 μm or less.

(Stretching)

The polylactic acid film (3) is preferably stretched at a low draw ratio to obtain a desired phase difference (Re) in the plane direction and a desired phase difference (Rth) in the thickness direction.

To stretch an unstretched film at a low draw ratio, it may be monoaxially stretched in a machine direction (may be referred to as "MD, vertical or longitudinal direction" hereinafter) or a direction orthogonal to the machine direction (may be referred to as "TD, crosswise or transverse direction" hereinafter). A biaxially stretched film can be produced by stretching the unstretched film in accordance with a sequential biaxial stretching method in which roll stretching and tenter stretching are carried out sequentially, a simultaneous biaxial stretching method in which tenter stretching is carried out, or a biaxial stretching method in which tubular stretching is carried out.

In the case of monoaxial stretching, the upper limit of the draw ratio is preferably less than 2.0 times. The lower limit of the draw ratio is preferably more than 1.20 time, more preferably 1.50 times or more, particularly preferably 1.80 times or more. By setting the draw ratio to this range, the phase difference (Re) in the plane direction and the phase difference (Rth) in the thickness direction can be set to the above ranges, respectively.

In the case of biaxial stretching, the upper limit of the area draw ratio (draw ratio in longitudinal direction×draw ratio in transverse direction) is preferably less than 4.00 times, more preferably 3.40 times or less, much more preferably 2.80 times or less, particularly preferably 2.30 times or less. The lower limit of the area draw ratio is preferably more than 1.20 times, more preferably 1.60 times or more, particularly preferably 1.80 times or more. By setting the area draw ratio to this range, the phase difference (Rth) in the thickness direction can be set to the above range.

Further, as for the draw ratios in the longitudinal direction and the transverse direction, the upper limit of the draw ratio in the longitudinal direction is preferably less than 3.00 times, more preferably 2.50 times or less, much more preferably 1.90 times or less, particularly preferably 1.60 times or less. The lower limit of the draw ratio is preferably 1.04 times or more, more preferably 1.10 times or more, much more preferably 1.15 times or more, particularly preferably 1.25 times or more.

The upper limit of the draw ratio in the transverse direction is preferably less than 3.00 times, more preferably 2.50 times or less, much more preferably 1.90 times or less, particularly preferably 1.60 times or less. The lower limit of the draw ratio is preferably 1.04 times or more, more preferably more than 1.10 times, much more preferably 1.15 times or more, particularly preferably 1.25 times or more. By setting the draw ratios in the longitudinal direction and the transverse direction to these ranges, the phase difference (Re) in the plane direction and the phase difference (Rth) in the thickness direction can be set to the above ranges, respectively.

The upper limit of the absolute value of the difference between the draw ratio in the longitudinal direction and the draw ratio in the transverse direction is not particularly limited but preferably 2.00 or less, more preferably 1.00 or less, particularly preferably 0.10 or less. The lower limit is preferably more than 0.01, particularly preferably 0.02 or more. By setting the absolute value of the difference between the draw ratio in the longitudinal direction and the draw ratio in the transverse direction to the above numerical range, the phase difference (Re) in the plane direction can be set to the above range.

The stretching temperature is preferably selected from a range from the glass transition temperature (Tg, unit: ° C.) of the polylactic acid (A) to the crystallization temperature (Tc, unit: ° C.). A temperature range as close to Tc as possible, that is, a temperature range at which the crystallization of the polylactic acid (A) hardly proceeds is preferably adopted, whereby the phase difference (Re) in the plane direction and the phase difference (Rth) in the thickness direction tend to become small.

Since the molecular chain is fixed at a temperature lower than Tg, it is difficult to carry out the stretching operation advantageously and to set the phase difference (Re) in the plane direction and the phase difference (Rth) in the thickness direction at the above draw ratio range to the numerical ranges specified by the present invention, respectively. At a temperature higher than Tc, the crystallization of the polylactic acid (A) proceeds, and it may be difficult to carry out the stretching step smoothly in this case as well.

Therefore, the lower limit of the stretching temperature is preferably Tg+5° C. or higher, more preferably Tg+10° C. or higher. The upper limit of the stretching temperature is preferably Tc−5° C. or lower, more preferably Tc−10° C. or lower.

In the present invention, the stretching temperature is preferably selected from the above temperature range so as to obtain the physical properties of the film and the stabilization of the stretching step at the same time. Since the physical properties of the film and the stabilization of the stretching step conflict with each other, the upper limit of the stretching temperature must be suitably set in consideration of the characteristic properties of the equipment.

Further, in the stretching step, the temperature of a stretching end portion is preferably 1° C. or more higher than the temperature of a stretching start portion from the viewpoint of preventing the thickness nonuniformity of the film. From this point of view, the temperature of the stretching end portion is more preferably 2° C. or more, much more preferably 3° C. or more, particularly preferably 4° C. or more higher than the temperature of the stretching start portion. When the temperature of the stretching end portion is much higher than the temperature of the stretching start portion, differences in physical properties in the transverse direction of the film tend to appear. From this point of view, the temperature difference between the stretching end portion and the stretching start portion is preferably 30° C. or less, more preferably 20° C. or less, much more preferably 15° C. or less, particularly preferably 10° C. or less.

(Heat Treatment)

The above monoaxially stretched film and biaxially stretched film are preferably heated at 90 to 210° C. The heat treatment corresponds to so-called "heat setting". This heat treatment promotes the crystallization of complex-phase polylactic acid and can reduce the heat shrinkage factor of the obtained optical polylactic acid film advantageously. From this point of view, the lower limit of the heat treatment temperature is preferably 100° C. or higher, more preferably 120° C. or higher, much more preferably 140° C. or higher. When the heat treatment temperature becomes too high and close to the melting temperature of the polylactic acid (A), the mechanical properties such as breaking strength of the polylactic acid film tend to degrade and the thickness nonuniformity of the film tends to become worse. From this point of view, the upper limit of the heat treatment temperature is preferably 200° C. or lower, more preferably 180° C. or lower.

The heat treatment time is preferably 1 second to 30 minutes. To enhance the effect of improving heat dimensional stability, when the heat treatment temperature is high, a relatively short heat treatment time is required and when the heat treatment temperature is low, a relatively long heat treatment time is required. For example, a resin composition having a Tc of 140° C. must have a heat treatment time of at least 30 seconds at a heat treatment temperature of 140° C. However, the polylactic acid film which has been heated at 150° C. for 10 seconds or at 90° C. for 5 hours can have a heat shrinkage factor of 4% or less.

To adopt the above heat treatment at the above draw ratio range is one of preferred means of setting the phase difference (Re) in the plane direction and the phase difference (Rth) in the thickness direction to the numerical ranges specified by the present invention.

A film obtained by carrying out the above heat treatment has excellent transparency and heat resistance. Stated more specifically, a change in haze after 5 hours of a heat treatment at 90° C. can be made small.

The film obtained as described above may be optionally subjected to a surface activation treatment such as plasma treatment, amine treatment or corona treatment by conventionally known methods.

(Application Purposes of Polylactic Acid Film (3))

The polylactic acid film (3) is useful as a phase difference film. Since the polylactic acid film (3) has a phase difference (Re) in the plane direction of more than 20 nm and 130 nm or less and a phase difference (Rth) in the thickness direction of 90 to 350 nm, it is useful as an optical correction film for VA-mode liquid crystal displays. Since the phase difference film composed of the polylactic acid film (3) comprises stereocomplex polylactic acid and its phase difference can be finely controlled by stretching conditions and heat treatment conditions, when it is used in a liquid crystal display, it can exhibit excellent optical properties.

The phase difference film composed of the polylactic acid film (3) of the present invention can be used in liquid crystal displays, plasma displays, organic EL displays, field emission displays and rear projection TV displays as a constituent member of a polarizing plate. The phase difference film may be optionally subjected to surface functioning treatments such as antireflection treatment, transparent conducting treatment, electromagnetic shielding treatment, gas barrier treatment and antifouling treatment.

The invention of the polylactic acid film (3) includes the following inventions.

1. An optical polylactic acid film comprising a resin composition containing polylactic acid (A) which comprises a poly (L-lactic acid) component and a poly (D-lactic acid) component and having a crystal melting peak at 190° C. or higher in differential scanning calorimeter (DSC) measurement and a stereocomplex crystal rate (S) defined by the following equation (i) of 90% or more, wherein
the polylactic acid film has a phase difference (Re) in the plane direction defined by the following equation (ii) of 30 to 130 nm, a phase difference (Rth) in the thickness direction defined by the following equation (iii) of 90 to 350 nm and a heat shrinkage factor in longitudinal and transverse directions of 4% or less when it is heated at 90° C. for 5 hours.

$$S(\%) = [\Delta Hmsc/(\Delta Hmh + \Delta Hmsc)] \times 100 \quad (i)$$

($\Delta Hmsc$ is the melting enthalpy (J/g) of the crystal melting peak of stereocomplex-phase polylactic acid. $\Delta Hmh$ is the melting enthalpy (J/g) of the crystal melting peak of homo-phase polylactic acid.)

$$Re = (nx - ny) \times d \quad (ii)$$

$$Rth = ((nx + ny)/2 - nz) \times d \quad (iii)$$

(nx is a refractive index in the longitudinal direction of the film. ny is a refractive index in the transverse direction of the film. nz is a refractive index in the thickness direction of the film. d is the thickness (nm) of the film.)

2. The optical polylactic acid film in the above paragraph 1 which comprises a steric accelerator and/or a block forming agent.
3. The optical polylactic acid film of the above paragraph 2, wherein the steric accelerator is a phosphoric acid metal salt and the block forming agent is a compound having at least one group selected from the group consisting of epoxy group, oxazoline group, oxazine group, isocyanate group, ketene group and carbodiimide group in the molecule.
4. The optical polylactic acid film of anyone of the above paragraphs 1 to 3 which has a haze of 2% or less and a haze change before and after 5 hours of a heat treatment at 90° of 2% or less.
5. The optical polylactic acid film of anyone of the above paragraphs 1 to 4 which is used as a phase difference film.
6. The optical polylactic acid film of the above paragraph 5 which is used as an optical correction film for VA-mode liquid crystal displays.
7. A phase difference film which is composed of the optical polylactic acid film of any one of the above paragraphs 1 to 6.
8. A polarizing plate which consists of the phase difference film of the above paragraph 7 and a polarizing film.
9. A liquid crystal display comprising the phase difference film of the above paragraph 7.

10. A process for producing the optical polylactic acid film of the above paragraph 1, comprising the steps of:
obtaining an unstretched film of a resin composition; and heating the film at a temperature of 90 to 210° C.

EXAMPLES

Examples 1 to 7 and Comparative Example 1

The following examples are provided for the purpose of further illustrating the present invention but are in no way to be taken as limiting. Physical property values in Examples 1 to 7 and Comparative Example 1 were obtained by the following methods.

(1) Weight Average Molecular Weigh (Mw) and Number Average Molecular Weight (Mn)

They were obtained by gel permeation chromatography (GPC) in comparison with a polystyrene standard sample.

The GPC measuring instrument had the following constitution, and measurement was carried out by letting a chloroform eluant flow at a column temperature of 40° C. and a flow rate of 1.0 ml/min and injecting 10 µl of a sample having a concentration of 1 mg/ml (chloroform containing 1% of hexafluoroisopropanol).

Detector: RID-6A differential refractometer of Shimadzu Corporation
Pump: LC-9A of Shimadzu Corporation
Column: TSKgelG3000HXL, TSKgelG4000HXL and TSKgelG5000HXL and TSKguardcokumnHXL-L of Tosoh Corporation are connected in series.

(2) Crystal Melting Peak Temperature, Crystal Melting Enthalpy ($\Delta Hmh$, $\Delta Hmsc$) and Stereocomplex Crystal Rate (S)

The DCS7 differential scanning calorimeter (DSC) of Perkin Elmer Co., Ltd. was used to measure these. 10 mg of the sample was heated from 30° C. to 250° C. at a temperature elevation rate of 20° C./min in a nitrogen atmosphere as a 1st run to measure its crystal melting peak temperatures (Tmh, Tmsc) and melting enthalpies ($\Delta Hmh$, $\Delta Hmsc$) thereof. The stereocomplex crystal rate (S) (unit: %) was obtained based on the following equation from the melting enthalpy ($\Delta Hmh$) of the low-melting point crystal melting peak at a temperature lower than 190° C. and the melting enthalpy ($\Delta Hmsc$) of the high-melting point crystal melting peak at a temperature of 190° C. or higher of polylactic acid which comprises a poly (L-lactic acid) component and a poly(D-lactic acid) component.

$$S = \{(\Delta Hmsc/(\Delta Hmsc + \Delta Hmh)\} \times 100$$

(3) Melt Stability (%)

The retention of the reduced viscosity ($\eta sp/c$) after the sample was kept at 260° C. for 10 minutes in a nitrogen atmosphere was measured. If melt stability is 80% or more when the polylactic acid (A) is formed into a film, ordinary melt extrusion can be carried out without a problem and it is judged that melt stability is acceptable.

The reduced viscosity ($\eta s_{p/c}$) was measured at 35° C. with an Ubbelohde's viscosity metering tube by dissolving 1.2 mg of the sample in 100 ml of a mixed solvent of tetrachloroethane and phenol (weight ratio of 6/4).

(4) Wet Heat Stability (%)

The sample was kept at 80° C. and 90% RH for 11 hours to measure the retention (unit: %) of its reduced viscosity ($\eta_{sp/c}$) as wet heat stability which is a parameter for durability. When the parameter is 80% or more, the polylactic acid film can be used stably under an ordinary wet heat condition and it is judged that its durability is acceptable (○). When the parameter is 90% or more, it is judged that wet heat stability is especially high (◎). When the parameter is less than 80%, it is judged that wet heat stability is unacceptable (X).

(5) Measurement of Haze

The haze of a film was measured by using the Hazemeter MDH2000 of Nippon Denshoku Co. Ltd. in accordance with 6.4 of JIS K7105-1981.

When the haze is higher than 10%, it is judged that transparency is unsatisfactory. When the haze is 1% or less, it is judged that the film has such high transparency that it can used as an optical film.

The sample is heated at 140° C. for 10 minutes by using a hot air drier to measure its haze in the same manner as described above to obtain a haze difference before and after the heat treatment (haze after heat treatment−haze before heat treatment) as a haze change.

(6) Optical Purity

The optical purity was obtained by putting a diluted solution of polylactic acid dissolved in chloroform into a predetermined vessel and measuring the optical rotation of the solution with an optical rotation measuring instrument. When the optical rotation is 100% in the case of 100% of L-lactic acid and −100% in the case of 100% of D-lactic acid, a percentage obtained from the optical rotation of the sample based on a proportional expression is taken as an optical purity.

(7) Thickness Variation

The thickness of the sample was measured 2 m in the longitudinal direction (MD) with an electron micrometer to obtain a ratio (percentage) by dividing the difference between the maximum thickness and the minimum thickness by average thickness as a thickness variation (unit: %) and evaluated based on the following criteria.

◎: 2% or less
○: more than 2% and 5% or less
Δ: more than 5% and 10% or less
X: more than 10%

When the thickness variation becomes large, the haze change tends to become large disadvantageously probably because the orientation of the surface layer changes at the time of forming a film. Further, workability at the time of molding tends to become worse disadvantageously. Stated more specifically, when the above thickness nonuniformity is more than 10%, the film cannot be used.

Reference Example 1

Synthesis of Polylactic Acid by Melt Ring-Opening Polymerization of Lactide

After the inside of a vertical stirring tank (40 liters) equipped with a full-zone wing and having a vacuum pipe, nitrogen gas pipe, catalyst, L-lactide solution introduction pipe and alcohol initiator introduction pipe was substituted by nitrogen, 30 kg of L-lactide, 0.90 kg (0.030 mol/kg) of stearyl alcohol and 6.14 g ($5.05 \times 10^{-4}$ mole/1 kg) of tin octylate were fed to the tank and heated at 150° C. under a nitrogen pressure of 106.4 kPa. When the content was dissolved, stirring was started and the inside temperature was further raised to 190° C. Since a reaction starts when the inside temperature exceeds 180° C., cooling was started to maintain the inside temperature at 185 to 190° C. to continue the reaction for 1 hour. Stirring was further continued to carry out the reaction at a nitrogen pressure of 106.4 kPa and an inside temperature of 200 to 210° C. for 1 hour and then stopped to add a phosphorus-based catalyst deactivator.

After the resulting mixture was left for 20 minutes to remove air bubbles, the inside pressure was raised from 2 atm. to 3 atm. in terms of nitrogen pressure and a prepolymer was extruded into a chip cutter to obtain a pellet of the prepolymer having a weight average molecular weight of 130,000 and a molecular weight dispersion of 1.8.

Further, the pellet was dissolved in the extruder and injected into an anxial basket type reactor at a rate of 15 kg/hr, the inside pressure was reduced to 10.13 kPa to reduce the amount of the residual lactide, the obtained product was formed into a chip again, and the resulting poly(L-lactic acid) resin had a weight average molecular weight of 120,000, a molecular weight dispersion of 1.8 and a lactide content of 0.005 wt %.

The similar synthesis experiment was conducted by using D-lactide in place of L-lactide to polymerize a poly(D-lactic acid) resin having a weight average molecular weight of 120,000, a molecular weight dispersion of 1.8 and a lactide content of 0.005 wt %.

Examples 1 to 2 and 4 to 6 and Comparative Example 1

The poly(L-lactic acid) resin and the poly(D-lactic acid) resin produced in the above Reference Example 1 were dried at 120° C. for 5 hours to obtain a mixture thereof in a weight ratio of 1/1. After an amount shown in the table of a crystallization nucleating agent (triclinic inorganic particles (D) and/or a phosphoric acid ester metal salt (E)) was mixed with 100 parts by weight of the obtained mixture, the resulting mixture was melt kneaded by means of a double-screw extruder at a temperature shown in the table and melt extruded into a film form by using a die having a lip opening shown in the table and a temperature of 260° C. at a casting rate of 40 m/min, and the obtained film was brought into close contact with the surface of a mirror-surface cooling drum by an electrostatic casting method using a platinum coated linear electrode to be solidified so as to produce a polylactic acid film. The melt stability of the polylactic acid film was 80% in all the experiments and therefore acceptable. The characteristic properties of the obtained polylactic acid films are shown in Table 1.

Example 3

A polylactic acid film was produced in the same manner as in Example 2 except that 0.3 part by weight of Carbodilite LA-1 (of Nisshinbo Industries, Inc.) was mixed as a carboxyl group sealing agent in addition to the crystallization nucleating agent. The characteristic properties of the obtained polylactic acid film are shown in Table 1.

Reference Example 2

Production of Polylactic Acid (A3) by Double-Screw Kneader

The poly(L-lactic acid) resin and the poly(D-lactic acid) resin obtained in Reference Example 1 were mixed together in a weight ratio of 1/1, 100 parts by weight of the obtained mixture and 0.1 part by weight of a phosphoric acid ester metal salt were uniformly mixed together by means of a blender, the obtained mixture was dried at 120° C. for 5 hours and supplied into the first feed port of a double-screw kneader to be melt kneaded for a residence time of 2 minutes at a cylinder temperature of 230° C. while air was evacuated at a vent pressure of 13.3 Pa and extruded into a strand in a water tank, and the strand was cut into a chip by a chip cutter to obtain polylactic acid (A3).

Example 7

The polylactic acid (A3) produced in the above Reference Example 2 was dried at 120° C. for 5 hours and melt extruded into a film form by means of a single-screw extruder at a resin temperature of 230° C. by using a die having a lip opening shown in the table and a temperature of 230° C. at a casting rate of 40 m/min, and the obtained film was brought into close contact with the surface of a mirror-surface cooling drum by the electrostatic casting method using a platinum coated linear electrode to be solidified so as to produce a polylactic acid film. The characteristic properties of the obtained polylactic acid film are shown in Table 1.

TABLE 1

|  |  | Example No. | | | |
| --- | --- | --- | --- | --- | --- |
|  |  | C. Ex. 1 | Ex. 1 | Ex. 2 | Ex. 3 |
| Crystallization nucleating agent | type | None | NA71 | NA71 | NA71 |
|  | Amount (parts by weight) |  | 0.05 | 0.1 | 0.1 |
| Carboxyl group sealing agent | type |  |  |  | Carbodilite LA-1 |
|  | Amount (parts by weight) |  |  |  | 0.3 |
| Extruded resin temperature (° C.) |  | 230 | 230 | 232 | 232 |
| Lip opening of die (mm) |  | 2 | 2 | 2 | 2 |
| Film thickness (μm) |  | 80 | 80 | 80 | 80 |
| Physical properties of film |  |  |  |  |  |
| Stereocomplex crystal rate (S) (%) |  | 84 | 92 | 98 | 100 |
| Haze(%) |  | 11.0 | 4.0 | 0.5 | 0.6 |
| Haze change after 10 minutes of heat treatment at 140° C. (%) |  | 6.0 | 2.0 | 0.4 | 0.2 |
| Crystal melting temperature Tmh(° C.)/Tmsc(° C.) |  | 166/213 | 167/216 | 167/218 | —/215 |
| Thickness variation (MD) (%) |  | ○ | ○ | ◎ | ◎ |
| Wet heat stability |  | X | ○ | ○ | ◎ |

|  |  | Example No. | | | |
| --- | --- | --- | --- | --- | --- |
|  |  | Ex. 4 | Ex. 5 | Ex. 6 | Ex. 7 |
| Crystallization nucleating agent | type | NA11 | NA71 | NA71 | NA71 |
|  | Amount (parts by weight) | 0.02 | 0.1 | 0.1 | 0.1 |
| Carboxyl group sealing agent | type |  |  |  |  |
|  | Amount (parts by weight) |  |  |  |  |
| Extruded resin temperature (° C.) |  | 232 | 230 | 230 | 230 |
| Lip opening of die (mm) |  | 2 | 4 | 6 | 2 |
| Film thickness (μm) |  | 80 | 80 | 80 | 80 |
| Physical properties of film |  |  |  |  |  |
| Stereocomplex crystal rate (S) (%) |  | 97 | 98 | 98 | 100 |
| Haze(%) |  | 0.6 | 4.0 | 6.0 | 0.5 |
| Haze change after 10 minutes of heat treatment at 140° C. (%) |  | 0.4 | 2.0 | 4.0 | 0.4 |
| Crystal melting temperature Tmh(° C.)/Tmsc(° C.) |  | 167/218 | 167/216 | 167/216 | —/218 |
| Thickness variation (MD) (%) |  | ◎ | ○ | Δ | ◎ |
| Wet heat stability |  | ○ | ○ | ○ | ○ |

Ex.: Example, C. Ex.: Comparative Example
Notes)
NA71: crystallization nucleating agent containing the Adekastab NA-71 phosphoric acid ester metal salt of ADEKA Corporation and an aid
NA11: crystallization nucleating agent containing a phosphoric acid ester sodium salt of Asahi Denka Kogyo K.K.
NA71: crystallization nucleating agent containing the Adekastab NA-71 phosphoric acid ester metal salt of ADEKA Corporation and an aid Examples 8 to 21

The evaluation methods and the raw materials in Examples 8 to 21 are as follows.
(1) Molecular Weight The weight average molecular weight (Mw) and the number average molecular weight (Mn) were measured by gel permeation chromatography (GPC) and calculated in terms of standard polystyrene.

The following GPC measuring instrument was used.
Detector: RID-6A difference refractometer of Shimadzu Corporation
Column: TSKgelG3000HXL, TSKgelG4000HXL, TSKgelG5000HXL and TSKguardcokumnHXL-L of Tosoh Corporation were connected in series, or TSKgelG2000HXL, TSKgelG3000HXL and TSKguardcokumnHXL-L of Tosoh Corporation were connected in series.

10 μl of a sample having a concentration (chloroform containing 1% of hexafluoroisopropanol) of 1 mg/ml was injected and measured by using chloroform as an eluent at 40° C. and a flow rate of 1.0 ml/min.
(2) Lactide Content The sample was dissolved in hexafluoroisopropanol to determine the lactide content by $^{13}$C-NMR.
(3) Content of Carbodiimide Compound The content of the carbodiimide compound was measured by comparison between the characteristic absorption of the resin and the characteristic absorption of the carbodiimide by the MAGJA-750 Fourier transformation infrared spectrophotometer of Nikore Co., Ltd.
(4) Carboxyl Group Concentration The sample was dissolved in purified o-cresol in a nitrogen gas stream and titrated with an ethanol solution of 0.05 N potassium hydroxide using Bromocresol Blue as an indicator.
(5) Stereocomplex Crystal Rate (S), Crystal Melting Peak Temperature and Crystal Melting Enthalpy As for the stereocomplex crystal rate (S), the crystal melting peak temperature and the crystal melting enthalpy, the crystal melting peak temperature (unit: ° C.) and the crystal melting enthalpy (unit: J/g) were measured with DSC (TA-2920 of TA Instrument Co., Ltd.), and the stereocomplex crystal rate (S) was obtained from the crystal melting enthalpy based on the following equation (i). The amount of the sample in the DSC measurement was 10 mg in the case of a resin before it was formed into a film and 20 mg in the case of a film, the measurement temperature range was 25 to 290° C., and the temperature elevation rate was 20° C./min.

$$S(\%)=[\Delta Hmsc/(\Delta Hmh+\Delta Hmsc)]\times 100 \qquad (i)$$

(ΔHmsc is the melting enthalpy (unit: J/g) of the melting peak of the complex-phase crystal, and ΔHmh is the melting enthalpy (unit: J/g) of the crystal melting peak of homo-phase polylactic acid.)
(6) Heat Shrinkage Factor of Film:

The heat shrinkage factor of the film was obtained from a change in the length of the film after it was heated at 90° C. for 5 hours and returned to room temperature (25° C.) in accordance with ASTM D1204.
(7) Total Light Transmittance This was measured in accordance with ASTM D1003.
(8) Haze The haze of a film having a thickness of 40 μm was measured by using the Hazemeter MDH2000 of Nippon Denshoku Co. Ltd. in accordance with 6.4 of JIS K7105-1981.
(i) Haze Before and After 5 Hours of Heat Treatment at 90° C.

The film was heated at 90° C. for 5 hours and returned to room temperature to measure its haze so as to obtain the difference in haze before and after the heat treatment (haze change) in accordance with ASTM D1204.
(ii) Haze Before and After 10 Minutes of Heat Treatment at 140° C.

The sample was heated at 140° C. for 10 minutes by using a hot air drier to measure its haze in the same manner as above so as to obtain the difference in haze before and after the heat treatment (haze after heat treatment−haze before heat treatment) as a haze change.

(9) Stereo Crystallinity (K)

The crystallization enthalpy (unit: J/g) and the crystal melting enthalpy (unit: J/g) were measured by DSC (TA-2920 of TA Instrument Co., Ltd.) to obtain stereo crystallinity (K) (unit %) based on the following equation (iv). The amount of the sample in the DSC measurement was 10 mg in the case of a resin before it was formed into a film and 20 mg in the case of a film, the measurement temperature range was 25 to 290° C., and the temperature elevation rate was 20° C./min.

$$K=(\Delta Hmsc-\Delta Hc)/142 \quad \text{(iv)}$$

$\Delta Hmsc$: melting enthalpy (J/g) of crystal melting peak of stereocomplex-phase polylactic acid
$\Delta Hc$: crystallization enthalpy (J/g) of polylactic acid 142 (J/g) is the equilibrium melting enthalpy of the stereocomplex polylactic acid crystal.

(10) glass Transition Temperature

This was obtained by using DSC (TA-2920 of TA Instrument Co., Ltd.). The amount of the sample in the DSC measurement was 10 mg in the case of a resin before it was formed into a film and 20 mg in the case of a film, the measurement temperature range was 25 to 290° C., and the temperature elevation rate was 20° C./min.

(11) Phase Difference (Re) in Plane Direction and Phase Difference (Rth) in Thickness Direction The refractive index (nx) in the longitudinal direction of the film, the refractive index (ny) in the transverse direction and the refractive index (nz) in the thickness direction were measured by a spectral ellipsometer (M-150 of Nippon Bunko Co., Ltd.). The measurement wavelength was 550 nm.

The phase difference (Re) in the plane direction of the film and the phase difference (Rth) in the thickness direction of the film were obtained from the refractive index (nx) in the longitudinal direction, the refractive index (ny) in the transverse direction, the refractive index (nz) in the thickness direction and the thickness (d, unit: nm) based on the following equations (ii) and (iii), respectively.

$$Re=(nx-ny)\times d \quad \text{(ii)}$$

$$Rth=((nx+ny)/2-nz)\times d \quad \text{(iii)}$$

(12) Thickness Variation

The thickness of the film was measured 2 m in the longitudinal direction (MD, machinery direction) with an electron micrometer to obtain the ratio(percentage) of the difference between the maximum thickness (unit: μm) and the minimum thickness (unit: μm) to average thickness (unit: μm) as a thickness variation (unit: %) and evaluated based on the following criteria.

⊚: thickness variation of 2% or less
○: thickness variation of more than 2% and 5% or less
Δ: thickness variation of more than 5% and 10% or less
X: thickness variation of more than 10%

When the thickness variation becomes large, the haze change tends to become large disadvantageously. Further, workability at the time of molding tends to become worse disadvantageously. When the above thickness variation is more than 10%, the film cannot be used.

(13) Wet Heat Stability

The sample was kept at 80° C. and 90% RH for 11 hours to obtain the retention (unit: %) of its reduced viscosity ($\eta_{sp/c}$). When the retention is 80% or more, it is judged as acceptable (○) that the film has such high durability that it can be used stably under a wet heat condition (high wet heat stability). When the retention is less than 80%, it is judged as unacceptable (X) that the wet heat stability is unsatisfactory.

The polylactic acid (A) was prepared in the following Production Examples.

Production Example 1-1

Production of poly(L-lactic acid) (PLLA1)

0.005 part by weight of tin octylate was added to 100 parts by weight of L-lactide (manufactured by Musashino Kagaku Kenkyusho Co., Ltd., optical purity of 100%) and reacted with the L-lactide in a nitrogen atmosphere in a reactor having a stirring blade at 180° C. for 2 hours, phosphoric acid was added in an amount 1.2 times the equivalent of tin octylate, the residual lactide was removed under a reduced pressure of 13.3 Pa, and the obtained product was formed into a chip to obtain poly(L-lactic acid) (PLLA1).

The obtained poly(L-lactic acid) (PLLA1) had a weight average molecular weight (Mw) of 152,000, a glass transition temperature (Tg) of 55° C., a melting point of 175° C., a carboxyl group concentration of 14 eq/ton and a lactide content of 350 ppm.

Production Example 1-2

Production of poly(D-lactic acid) (PDLA1)

Polymerization was carried out under the same conditions as in Production Example 1-1 except that the L-lactide of Production Example 1-1 was changed to D-lactide (manufactured by Musashino Kagaku Kenkyusho Co., Ltd., optical purity of 100%) to obtain poly(D-lactic acid) (PDLA1).

The obtained poly(D-lactic acid) (PDLA1) had a weight average molecular weight of 151,000, a glass transition temperature (Tg) of 55° C., a melting point of 175° C., a carboxyl group concentration of 15 eq/ton and a lactide content of 450 ppm. The results are shown in Table 2.

TABLE 2

| Characteristic properties | unit | Production Example 1-1 PLLA1 | Production Example 1-2 PDLA1 |
|---|---|---|---|
| Melting point | ° C. | 175 | 175 |
| Glass transition temperature (Tg) | ° C. | 55 | 55 |
| Weight average molecular weight (Mw) | ($\times 10^4$) | 15.2 | 15.1 |
| Carboxyl group concentration | eq/ton | 14 | 15 |
| Lactide content | ppm | 350 | 450 |

Production Example 2-1

Production of Polylactic Acid A1

50 parts by weight of the poly(L-lactic acid) (PLLA1) obtained in Production Example 1-1, 50 parts by weight of the poly(D-lactic acid) (PDLA1) obtained in Production Example 1-2 and 0.03 part by weight of a phosphoric acid metal salt (Adekastab NA-71 of ADEKA Corporation) were fed from the first feed port of a double-screw kneader to be melt kneaded together at a cylinder temperature of 250° C. Further, 0.3 part by weight of the Carbodilite LA-1 of Nisshinbo Industries, Inc. was fed from the second feed port based on 100 parts by weight of the total of the poly(L-lactic acid) and the poly(D-lactic acid) and melt kneaded while air was evacuated at a vent pressure of 13.3 Pa. Thereafter, the obtained product was extruded, cooled and pelletized to obtain polylactic acid A1.

Production Example 2-2

Production of Polylactic Acid A2

Polylactic acid was obtained as polylactic acid A2 in the same manner as in Production Example 2-1 except that NA-71 and LA-1 were not added.

The weight average molecular weight (Mw), carboxyl group concentration, lactide content, stereocomplex crystal rate (S), stereo crystallinity (K), glass transition temperature (Tg) and crystal melting temperature of each of the obtained polylactic acids A1 and A2 are shown in Table 3.

TABLE 3

| | | | Production Example 2-1 polylactic acid A1 | Production Example 2-2 polylactic acid A2 |
|---|---|---|---|---|
| Polylactic acid (A) | Poly(L-lactic acid) | type | PLLA1 | PLLA1 |
| | Poly(D-lactic acid) | type | PDLA1 | PDLA1 |
| | Steric accelerator | type | NA-71 | — |
| | Block forming agent | type | LA-1 | — |
| Physical properties | Weight average molecular weight (Mw) | (×10$^4$) | 14.9 | 14.7 |
| | Lactide content | ppm | 61 | 62 |
| | Carboxyl group concentration | eq/ton | 1 | 15 |
| | Stereocomplex crystal rate (S) | % | 100 | 84 |
| | Stereo crystallinity (K) | % | 56 | 32 |
| | Glass transition temperature (Tg) | ° C. | 60 | 59 |
| | temperature (low-temperature side/high-temperature side) | | —/210 | 165/221 |

NA-71: Adekastab NA-71 (phosphoric acid ester metal salt) (manufactured by ADEKA Corporation)
LA-1: Carbodilite LA-1 (carbodiimide) (manufactured by Nisshinbo Industries, Inc.)

Examples 8 and 9

After the polylactic acid A1 obtained in Production Example 2-1 was dried at 110° C. for 5 hours, it was melt kneaded by means of an extruder at an extruded resin temperature shown in Table 4 and melt extruded into a film form by using a die having a lip opening shown in Table 4 and a temperature of 230° C., and the obtained film was brought into close contact with the surface of a cooling drum to be solidified so as to obtain an unstretched film.

Then, the obtained unstretched film was heat set at a heat treatment temperature shown in Table 4 for 100 seconds to obtain a polylactic acid film. The physical properties of the obtained polylactic acid films are shown in Table 4.

Examples 10 and 11

An unstretched film (before a heat treatment) obtained in the same manner as in Example 8 was stretched and heat set (100 seconds) under film forming conditions shown in Table 4 to obtain a polylactic acid film. The physical properties of the obtained polylactic acid films are shown in Table 4.

Example 12

A polylactic acid film was obtained in the same manner as in Example 8 except that extrusion conditions were changed as shown in Table 4. The physical properties of the obtained polylactic acid film are shown in Table 4.

Comparative Example 2

A polylactic acid film was obtained in the same manner as in Example 8 except that the polylactic acid A2 obtained in Production Example 2-2 was used in place of the polylactic acid A1. The physical properties of the obtained polylactic acid film are shown in Table 4. Since the polylactic acid film obtained in Comparative Example 2 had an unsatisfactory stereocomplex crystal rate (S), it had low heat dimensional stability. It was also inferior in wet heat stability.

TABLE 4

| | | | unit | Ex. 8 | Ex. 9 | Ex. 10 |
|---|---|---|---|---|---|---|
| Resin composition | polylactic acid (component A) | | type | polylactic acid A1 | polylactic acid A1 | polylactic acid A1 |
| Extrusion conditions | extruded resin temperature | | ° C. | 230 | 230 | 230 |
| | Lip opening of die | | mm | 2 | 1 | 2 |
| | Thickness of unstretched film | | μm | 80 | 40 | 82 |
| | Draft ratio | | — | 25.0 | 25.0 | 24.4 |
| Film forming conditions | Draw ratio | longitudinal direction (MD) | times | — | — | 1.02 |
| | | Transverse direction (TD) | times | — | — | 1.01 |
| | | Area draw ratio | times | 1.00 | 1.00 | 1.03 |
| | Stretching temperature | start portion | ° C. | — | — | 68 |
| | | end portion | ° C. | — | — | 72 |
| | Heat treatment temperature | | ° C. | 100 | 100 | 120 |

TABLE 4-continued

|  |  |  | unit |  |  |  |
|---|---|---|---|---|---|---|
| Physical properties of film | Film thickness |  | μm | 80 | 40 | 80 |
|  | DSC measurement | crystal melting peak | °C. | 210 | 210 | 210 |
|  |  | Stereocomplex crystal rate (S) | % | 100 | 100 | 100 |
|  | Phase difference | Plane direction (Re) | nm | 3 | 2 | 4 |
|  |  | Thickness direction (Rth) | nm | 4 | 3 | 7 |
|  | Haze | before heat treatment | % | 0.3 | 0.2 | 0.3 |
|  |  | after 5 hours of heat treatment at 90° C. | % | 0.5 | 0.3 | 0.4 |
|  |  | Change after 5 hours of heat treatment at 90° C. | % | 0.2 | 0.1 | 0.1 |
|  |  | After 10 minutes of heat treatment at 140° C. | % | 0.8 | 0.5 | 0.6 |
|  |  | Change after 10 minutes of heat treatment at 140° C. | % | 0.5 | 0.3 | 0.3 |
|  | Heat shrinkage factor when heated at 90° C. for 5 hours | Longitudinal direction (MD) | % | 0.4 | 0.4 | 0.5 |
|  |  | Transverse direction (TD) | % | 0.4 | 0.4 | 0.5 |
|  | Wet heat stability |  | evaluation | ○ | ○ | ○ |
|  | thickness variation |  | evaluation | ○ | ○ | ◎ |

|  |  |  | unit | Ex. 11 | Ex. 12 | C. Ex. 2 |
|---|---|---|---|---|---|---|
| Resin composition | polylactic acid (component A) |  | type | polylactic acid A1 | polylactic acid A1 | polylactic acid A2 |
| Extrusion conditions | extruded resin temperature |  | °C. | 230 | 230 | 230 |
|  | Lip opening of die |  | mm | 2 | 6 | 2 |
|  | Thickness of unstretched film |  | μm | 84 | 80 | 80 |
|  | Draft ratio |  | — | 23.8 | 75.0 | 25.0 |
| Film forming conditions | Draw ratio | longitudinal direction (MD) | times | 1.03 | — | — |
|  |  | Transverse direction (TD) | times | 1.02 | — | — |
|  |  | Area draw ratio | times | 1.05 | 1.00 | 1.00 |
|  | Stretching temperature | start portion | °C. | 68 | — | — |
|  |  | end portion | °C. | 71 | — | — |
|  | Heat treatment temperature |  | °C. | 120 | 120 | 120 |
| Physical properties of film | Film thickness |  | μm | 80 | 80 | 80 |
|  | DSC measurement | crystal melting peak | °C. | 210 | 210 | 165/220 |
|  |  | Stereocomplex crystal rate (S) | % | 100 | 100 | 84 |
|  | Phase difference | Plane direction (Re) | nm | 3 | 3 | 3 |
|  |  | Thickness direction (Rth) | nm | 6 | 5 | 5 |
|  | Haze | before heat treatment | % | 0.3 | 0.3 | 1.8 |
|  |  | after 5 hours of heat treatment at 90° C. | % | 0.4 | 0.5 | 3.0 |
|  |  | Change after 5 hours of heat treatment at 90° C. | % | 0.1 | 0.2 | 1.2 |
|  |  | After 10 minutes of heat treatment at 140° C. | % | 0.6 | 0.8 | 7.8 |
|  |  | Change after 10 minutes of heat treatment at 140° C. | % | 0.3 | 0.5 | 6.0 |
|  | Heat shrinkage factor when heated at 90° C. for 5 hours | Longitudinal direction (MD) | % | 0.6 | 0.8 | 4.5 |
|  |  | Transverse direction (TD) | % | 0.6 | 0.5 | 4.5 |
|  | Wet heat stability |  | evaluation | ○ | ○ | X |
|  | thickness variation |  | evaluation | ◎ | Δ | X |

Ex.: Example, C. Ex.: Comparative Example (Polarizing Plates and Liquid Crystal Displays)

Polarizing plates and liquid crystal displays were fabricated by using the optical polylactic acid films obtained in Examples 8 to 12 in accordance with the method described in JP-A 2008-242172.

(Fabrication of Polarizing Plate A)

A polarizing film was produced by adsorbing iodine to a stretched polyvinyl alcohol film. Thereafter, each of the polylactic acid films obtained in Examples 8 to 12 was bonded to one side of the above polarizing film by using a polyvinyl alcohol-based adhesive and a commercially available cellulose triacetate film (Fujitac TD80UF of Fuji Film Co., Ltd.) which had been saponified was bonded to the other side of the above polarizing film by using a polyvinyl alcohol-based adhesive to fabricate a polarizing plate.

(Fabrication of Polarizing Plate B)

A polarizing film was produced by adsorbing iodine to a stretched polyvinyl alcohol film. Thereafter, Z-TAC (of Fuji Film Co., Ltd.) was bonded to one side of the above polarizing film by using a polyvinyl alcohol-based adhesive and a commercially available cellulose triacetate film (Fujitac TD80UF of Fuji Film Co., Ltd.) which had been saponified was bonded to the other side of the above polarizing film by using a polyvinyl alcohol-based adhesive to fabricate a polarizing plate.

(Fabrication of IPS-Mode Liquid Crystal Display)

A liquid crystal cell was taken out from the TH-32LX500 liquid crystal TV (manufactured by Matsushita Electric Industrial Co., Ltd.) and polarizing plates bonded to the viewer side and the backlight side were removed. In this liquid crystal cell, liquid crystal molecules were oriented substantially parallel to one another between glass substrates when no voltage was applied and black was displayed, and the slow-axis direction was horizontal to the screen. The polarizing plate A produced above was bonded to the glass substrate on the backlight side of the above parallel oriented cell by means of an adhesive. The polarizing plate B produced above was bonded to the glass substrate on the viewer side. The absorption axes of the polarizing plates placed on the both sides of the liquid crystal cell were arranged orthogonal to each other.

The obtained liquid crystal display had small dependence on color view angle and excellent color reproducibility.

Examples 13 to 15

After the polylactic acid A1 obtained in Production Example 2-1 was dried at 110° C. for 5 hours, it was melt kneaded by means of an extruder at an extruded resin temperature shown in Table 5 and melt extruded into a film form by using a die having a lip opening shown in Table 5 and a temperature of 230° C., and the obtained film was brought into close contact with the surface of a cooling drum to be solidified so as to obtain an unstretched film.

Then, the obtained unstretched film was stretched and heat set (100 seconds) under film forming conditions shown in Table 5 to obtain a polylactic acid film. The physical properties of the obtained polylactic acid films are shown in Table 5.

(Polarizing Plates and Liquid Crystal Displays)

Polarizing plates and liquid crystal displays were fabricated by using the optical polylactic acid films obtained in Examples 13 to 15 in accordance with the method described in JP-A 2008-242172.

(Fabrication of Polarizing Plate A)

A polarizing film was produced by adsorbing iodine to a stretched polyvinyl alcohol film. Thereafter, each of the polylactic acid films obtained in Examples 13 to 15 was bonded to one side of the above polarizing film by using a polyvinyl alcohol-based adhesive and a commercially available cellulose triacetate film (Fujitac TD80UF of Fuji Film Co., Ltd.) which had been saponified was bonded to the other side of the above polarizing film by using a polyvinyl alcohol-based adhesive to fabricate a polarizing plate.

(Fabrication of Polarizing Plate B)

A polarizing film was produced by adsorbing iodine to a stretched polyvinyl alcohol film. Thereafter, Z-TAC (manufactured by Fuji Film Co., Ltd.) was bonded to one side of the above polarizing film by using a polyvinyl alcohol-based adhesive and a commercially available cellulose triacetate film (Fujitac TD80UF of Fuji Film Co., Ltd.) which had been saponified was bonded to the other side of the above polarizing film by using a polyvinyl alcohol-based adhesive to fabricate a polarizing plate.

(Fabrication of IPS-Mode Liquid Crystal Display)

A liquid crystal cell was taken out from the TH-32LX500 liquid crystal TV (manufactured by Matsushita Electric Industrial Co., Ltd.) and polarizing plates bonded to the viewer side and the backlight side were removed. In this liquid crystal cell, liquid crystal molecules were oriented substantially parallel to one another between glass substrates

TABLE 5

| | | | unit | Ex. 13 | Ex. 14 | Ex. 15 |
|---|---|---|---|---|---|---|
| Resin composition | polylactic acid (component A) | | type | polylactic acid A1 | polylactic acid A1 | polylactic acid A1 |
| Extrusion conditions | extruded resin temperature | | ° C. | 230 | 230 | 230 |
| | Lip opening of die | | mm | 2 | 2 | 6 |
| | Thickness of unstretched film | | μm | 86 | 94 | 86 |
| | Draft ratio | | — | 23.3 | 21.3 | 69.8 |
| Film forming conditions | Draw ratio | longitudinal direction (MD) | times | 1.04 | 1.09 | 1.04 |
| | | Transverse direction (TD) | times | 1.03 | 1.08 | 1.03 |
| | | Area draw ratio | times | 1.07 | 1.18 | 1.07 |
| | Stretching temperature | start portion | ° C. | 68 | 68 | 68 |
| | | end portion | ° C. | 72 | 72 | 72 |
| | Heat treatment temperature | | ° C. | ° C. | 120 | 120 |
| Physical properties of film | Film thickness | | μm | 80 | 80 | 80 |
| | DSC measurement | crystal melting peak | ° C. | 210 | 210 | 210 |
| | | Stereocomplex crystal rate (S) | % | 100 | 100 | 100 |
| | Phase difference | Plane direction (Re) | nm | 4 | 5 | 4 |
| | | Thickness direction (Rth) | nm | 40 | 60 | 40 |
| | Haze | before heat treatment | % | 0.3 | 0.3 | 0.3 |
| | | after 5 hours of heat treatment at 90° C. | % | 0.4 | 0.4 | 0.4 |
| | | Change after 5 hours of heat treatment at 90° C. | % | 0.1 | 0.1 | 0.1 |
| | | After 10 minutes of heat treatment at 140° C. | % | 0.6 | 0.6 | 0.6 |
| | | Change after 10 minutes of heat treatment at 140° C. | % | 0.3 | 0.3 | 0.3 |
| | Heat shrinkage factor when heated at 90° C. for 5 hours | Longitudinal direction (MD) | % | 0.5 | 0.6 | 0.5 |
| | | Transverse direction (TD) | % | 0.5 | 0.6 | 0.5 |
| | Wet heat stability | | evaluation | ○ | ○ | ○ |
| | thickness variation | | evaluation | ◎ | ◎ | Δ |

Ex.: Example when no voltage was applied and black was displayed, and the slow-axis direction was horizontal to the screen. The polarizing plate A produced above was bonded to the glass substrate on the backlight side of the above parallel oriented cell by means of an adhesive. The polarizing plate B produced above was bonded to the glass substrate on the viewer side. The absorption axes of the polarizing plates placed on the both sides of the liquid crystal cell were arranged orthogonal to each other.

(Fabrication of VA-Mode Liquid Crystal Display)

A pair of polarizing plates (an upper polarizing plate and a lower polarizing plate) provided on a commercially available 37-inch VA-mode liquid crystal TV (manufactured by Sharp Corporation) were removed, and the polarizing plate A fabricated above was put on the viewer side and backlight side by means of an adhesive in such a manner that the polylactic acid film was positioned on the liquid crystal cell side. At this point, the polarizing plates were arranged such that the transmission axis of the polarizing plate (upper polarizing plate) on the viewer side and the transmission axis of the polarizing plate (lower polarizing plate) on the backlight side became orthogonal to each other.

All the obtained liquid crystal displays had excellent color reproducibility.

Examples 16 to 21

After the polylactic acid A1 obtained in Production Example 2-1 was dried at 110° C. for 5 hours, it was melt kneaded by means of an extruder at an extruded resin temperature shown in Table 6 and melt extruded into a film form by using a die having a lip opening shown in Table 6 and a temperature of 230° C., and the obtained film was brought into close contact with the surface of a cooling drum to be solidified so as to obtain an unstretched film.

Then, the obtained unstretched film was stretched and heat set (100 seconds) under film forming conditions shown in Table 6 to obtain a polylactic acid film. The physical properties of the obtained films are shown in Table 6.

TABLE 6

| | | | unit | Ex. 16 | Ex. 17 | Ex. 18 |
|---|---|---|---|---|---|---|
| Resin composition | polylactic acid (component A) | | type | polylactic acid A1 | polylactic acid A1 | polylactic acid A1 |
| Extrusion conditions | extruded resin temperature | | °C. | 230 | 230 | 230 |
| | Lip opening of die | | mm | 1 | 2 | 2 |
| | Thickness of unstretched film | | μm | 135 | 151 | 170 |
| | Draft ratio | | — | 7.4 | 13.2 | 11.8 |
| Film forming conditions | Draw ratio | longitudinal direction (MD) | times | 1.86 | 1.39 | 1.48 |
| | | Transverse direction (TD) | times | 1.81 | 1.36 | 1.44 |
| | | Area draw ratio | times | 3.37 | 1.89 | 2.13 |
| | Stretching temperature | start portion | °C. | 68 | 68 | 68 |
| | | end portion | °C. | 72 | 73 | 73 |
| | Heat treatment temperature | | °C. | 120 | 120 | 120 |
| Physical properties of film | Film thickness | | μm | 40 | 80 | 80 |
| | DSC measurement | crystal melting peak | °C. | 210 | 210 | 210 |
| | | Stereocomplex crystal rate (S) | % | 100 | 100 | 100 |
| | Phase difference | Plane direction (Re) | nm | 44 | 48 | 43 |
| | | Thickness direction (Rth) | nm | 126 | 124 | 148 |
| | Haze | before heat treatment | % | 0.3 | 0.5 | 0.5 |
| | | after 5 hours of heat treatment at 90° C. | % | 0.5 | 0.8 | 0.8 |
| | | Change after 5 hours of heat treatment at 90° C. | % | 0.2 | 0.3 | 0.3 |
| | | After 10 minutes of heat treatment at 140° C. | % | 0.8 | 1.3 | 1.3 |
| | | Change after 10 minutes of heat treatment at 140° C. | % | 0.5 | 0.8 | 0.8 |
| | Heat shrinkage factor when heated at 90° C. for 5 hours | Longitudinal direction (MD) | % | 0.5 | 0.4 | 0.4 |
| | | Transverse direction (TD) | % | 0.5 | 0.4 | 0.4 |
| | Wet heat stability | | evaluation | ○ | ○ | ○ |
| | thickness variation | | evaluation | ○ | ○ | ○ |

| | | | unit | Ex. 19 | Ex. 20 | Ex. 21 |
|---|---|---|---|---|---|---|
| Resin composition | polylactic acid (component A) | | type | polylactic acid A1 | polylactic acid A1 | polylactic acid A2 |
| Extrusion conditions | extruded resin temperature | | °C. | 230 | 230 | 230 |
| | Lip opening of die | | mm | 1 | 2 | 6 |
| | Thickness of unstretched film | | μm | 112 | 223 | 85 |
| | Draft ratio | | — | 8.9 | 9.0 | 70.6 |
| Film forming conditions | Draw ratio | longitudinal direction (MD) | times | 1.69 | 1.68 | 1.48 |
| | | Transverse direction (TD) | times | 1.65 | 1.66 | 1.44 |
| | | Area draw ratio | times | 2.79 | 2.79 | 2.13 |
| | Stretching temperature | start portion | °C. | 68 | 68 | 70 |
| | | end portion | °C. | 72 | 73 | 70 |
| | Heat treatment temperature | | °C. | 120 | 120 | 120 |

TABLE 6-continued

| Physical properties of film | Film thickness | | μm | 40 | 80 | 40 |
|---|---|---|---|---|---|---|
| | DSC measurement | crystal melting peak | °C. | 210 | 210 | 210 |
| | | Stereocomplex crystal rate (S) | % | 100 | 100 | 100 |
| | Phase difference | Plane direction (Re) | nm | 41 | 57 | 43 |
| | | Thickness direction (Rth) | nm | 102 | 246 | 148 |
| | Haze | before heat treatment | % | 0.3 | 0.3 | 0.5 |
| | | after 5 hours of heat treatment at 90° C. | % | 0.4 | 0.4 | 0.8 |
| | | Change after 5 hours of heat treatment at 90° C. | % | 0.1 | 0.1 | 0.3 |
| | | After 10 minutes of heat treatment at 140° C. | % | 0.6 | 0.6 | 1.3 |
| | | Change after 10 minutes of heat treatment at 140° C. | % | 0.3 | 0.3 | 0.8 |
| | Heat shrinkage factor when heated at 90° C. for 5 hours | Longitudinal direction (MD) | % | 0.5 | 0.5 | 0.4 |
| | | Transverse direction (TD) | % | 0.5 | 0.5 | 0.4 |
| | Wet heat stability | | evaluation | ○ | ○ | ○ |
| | thickness variation | | evaluation | ◉ | ◉ | Δ |

Ex.: Example (Polarizing Plates and Liquid Crystal Displays)

Polarizing plates and liquid crystal displays were fabricated by using the optical polylactic acid films obtained in Examples 16 to 21 in accordance with the method described in JP-A 2008-242172.

(Fabrication of Polarizing Plate)

A polarizing film was produced by adsorbing iodine to a stretched polyvinyl alcohol film. Thereafter, each of the polylactic acid films obtained in Examples 16 to 21 was bonded to one side of the above polarizing film by using a polyvinyl alcohol-based adhesive and a commercially available cellulose triacetate film (Fujitac TD80UF of Fuji Film Co., Ltd.) which had been saponified was bonded the other side of the above polarizing film by using a polyvinyl alcohol-based adhesive to fabricate a polarizing plate.

(Fabrication of VA-Mode Liquid Crystal Display)

A pair of polarizing plates (an upper polarizing plate and a lower polarizing plate) provided on a commercially available 37-inch VA-mode liquid crystal TV (manufactured by Sharp Corporation) were removed, and the polarizing plate produced above was put on the viewer side and backlight side by means of an adhesive in such a manner that the polylactic acid film was positioned on the liquid crystal cell side. At this point, the polarizing plates were arranged such that the transmission axis of the polarizing plate (upper polarizing plate) on the viewer side and the transmission axis of the polarizing plate (lower polarizing plate) on the backlight side became orthogonal to each other.

All the obtained liquid crystal displays had small dependence on color view angle and excellent color reproducibility.

Effect of the Invention

The polylactic acid film of the present invention has excellent transparency and can retain high transparency even when it is exposed to a high temperature.

The polylactic acid film of the present invention has a specific phase difference (Re) in the plane direction and a specific phase difference (Rth) in the thickness direction and excellent dimensional stability at the time of heating and is useful for optical purposes.

Industrial Feasibility

The polylactic acid film of the present invention may be used as a phase difference film in a liquid crystal display.

The invention claimed is:

1. A polylactic acid film obtained by melt extruding polylactic acid (A) and stretching monoaxially to more than 1.00 times and less than 2 times or stretching biaxially at an area draw ratio of less than 4 times wherein the polylactic acid (A) is prepared by melt kneading together
   (i) polylactic acid (B) which comprises an L-lactic acid unit as the main ingredient and 0 to 10 mol % of a component excluding the L-lactic acid unit and polylactic acid (C) which comprises a D-lactic acid unit as the main ingredient and 0 to 10 mol % of a component excluding the D-lactic acid unit in a (B/C) weight ratio of 10/90 to 90/10,
   (ii) 0.01 to 5 parts by weight of triclinic inorganic particles (D) and/or 0.01 to 5 parts by weight of a phosphoric acid ester metal salt (E) based on 100 parts by weight of the polylactic acid (B) and (C), and
   (iii) 0.01 to 10 parts weight of a carboxyl group sealing agent based on 100 parts by weight of the polylactic acid (B) and (C), and
   wherein
   (a) the polylactic acid film has a stereocomplex crystal rate (S) defined by the following equation (i) of 90% or more:

$$S = \{(\Delta Hmsc/(\Delta Hmsc + \Delta Hmh)\} \times 100 \quad (i)$$

(in the above equation, $\Delta Hmh$ is the melting enthalpy of a low-melting point crystal melting peak at a temperature lower than 190° C. obtained by differential scanning calorimeter (DSC) measurement and $\Delta Hmsc$ is the melting enthalpy of a high-melting point crystal melting peak at a temperature of 190° C. or higher obtained by DSC measurement),
   (b) a haze of 10% or less, and
   (c) a haze change of 5% or less after it is heated at 140° C. for 10 minutes.

2. The polylactic acid film according to claim 1 which is heated at 90 to 210° C.

3. The polylactic acid film according to claim 1 which has (d-1) a phase difference (Re) in the plane direction defined by the following equation (ii) of 20 nm or less and a phase difference (Rth) in the thickness direction defined by the following equation (iii) of less than 25 nm:

$$Re = (nx - ny) \times d \quad (ii)$$

$$Rth = ((nx + ny)/2 - nz) \times d \quad (iii)$$

(nx is a refractive index in the longitudinal direction of the film, ny is a refractive index in the transverse direction of the film, nz is a refractive index in the thickness direction of the film, d is the thickness (nm) of the film), and (e) a heat shrinkage factor in longitudinal and transverse directions of 4% or less when it is heated at 90° C. for 5 hours.

4. The polylactic acid film according to claim 1 which has (d–2) a phase difference (Re) in the plane direction defined by the following equation (ii) of 20 nm or less and a phase difference (Rth) in the thickness direction defined by the following equation (iii) of 25 to 90 nm:

$$Re=(nx-ny)\times d \quad \text{(ii)}$$

$$Rth=((nx+ny)/2-nz)\times d \quad \text{(iii)}$$

(nx is a refractive index in the longitudinal direction of the film, ny is a refractive index in the transverse direction of the film, nz is a refractive index in the thickness direction of the film, d is the thickness (nm) of the film), and (e) a heat shrinkage factor in longitudinal and transverse directions of 4% or less when it is heated at 90° C. for 5 hours.

5. The polylactic acid film according to claim 1 which has (d–3) a phase difference (Re) in the plane direction defined by the following equation (ii) of more than 20 nm and 130 nm or less and a phase difference (Rth) in the thickness direction defined by the following equation (iii) of 90 to 350 nm:

$$Re=(nx-ny)\times d \quad \text{(ii)}$$

$$Rth=((nx+ny)/2-nz)\times d \quad \text{(iii)}$$

(nx is a refractive index in the longitudinal direction of the film, ny is a refractive index in the transverse direction of the film, nz is a refractive index in the thickness direction of the film. d is the thickness (nm) of the film), and (e) a heat shrinkage factor in longitudinal and transverse directions of 4% or less when it is heated at 90° C. for 5 hours.

6. The polylactic acid film according to claim 1 which is an optical film.

7. The polylactic acid film according to claim 3 which is an optical correction film for IPS-mode liquid crystal displays.

8. The polylactic acid film according to claim 4 which is a protective film for polarizing plates.

9. The polylactic acid film according to claim 5 which is an optical correction film for VA-mode liquid crystal displays.

10. The polylactic acid film according to claim 1 wherein the carboxyl group sealing agent is a carbodiimide compound.

* * * * *